United States Patent
Thalmann et al.

(10) Patent No.: US 12,427,447 B2
(45) Date of Patent: *Sep. 30, 2025

(54) TREATMENT DEVICE FOR TREATING IN PARTICULAR LIQUID FLUIDS, AND TREATMENT UNIT AND CONNECTION HEAD OF A TREATMENT DEVICE

(71) Applicant: MANN+HUMMEL GmbH, Ludwigsburg (DE)

(72) Inventors: Christian Thalmann, Speyer (DE); Mike Maertz, Harthausen (DE); Duc Cuong Nguyen, Laatzen (DE); Hemanth Kumar Venkatesh Nayak, Karnataka (IN); Ludwig Bammersperger, Reisbach (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 775 days.

This patent is subject to a terminal disclaimer.

(21) Appl. No.: 17/541,651

(22) Filed: Dec. 3, 2021

(65) Prior Publication Data

US 2022/0088506 A1    Mar. 24, 2022

Related U.S. Application Data

(63) Continuation of application No. PCT/EP2020/079587, filed on Oct. 21, 2020.

(30) Foreign Application Priority Data

Oct. 25, 2019  (DE) .................... 10 2019 128 834.7
Jan. 29, 2020  (DE) .................... 10 2020 102 163.1

(51) Int. Cl.
*B01D 27/08*  (2006.01)
*B01D 35/30*  (2006.01)

(52) U.S. Cl.
CPC ............. *B01D 27/08* (2013.01); *B01D 35/30* (2013.01); *B01D 2201/302* (2013.01); *B01D 2201/4007* (2013.01); *B01D 2201/4015* (2013.01)

(58) Field of Classification Search
CPC ...... B01D 2201/302; B01D 2201/4007; B01D 2201/4015; B01D 27/06; B01D 27/08; B01D 35/30
See application file for complete search history.

(56) References Cited

U.S. PATENT DOCUMENTS

| 5,876,600 A | 3/1999 | Matsubara et al. |
| 10,907,594 B2 | 2/2021 | Thalmann et al. |

(Continued)

FOREIGN PATENT DOCUMENTS

| JP | 2013049012 A | 3/2013 |
| WO | 2015091665 A1 | 6/2015 |

OTHER PUBLICATIONS

Office Action in corresponding Japanese Appln. No. 2022-523977, Nov. 19, 2024, 4 pages, Japan.

*Primary Examiner* — Dirk R Bass

(57) ABSTRACT

A fluid treatment device has an exchangeable treatment unit and a connection head. A bayonet-type connection device connects connection head and treatment unit to each other by a plug-in/rotation movement about a connection axis of the treatment device and is provided with a housing connection part and a head connection part that operatively engage each other to form a connection of the bayonet-type connection device. Housing connection part and head connection part each have a mutually complementary functional element extending circumferentially about the connection axis and operatively connectable to each other. One functional element has an assembly ramp passing into a first support region perpendicular to the connection axis. The (Continued)

other functional element has a slide region adjoined by a second support region perpendicular to the connection axis. In connection end position, first and second support regions are positioned on top of each other relative to the connection axis.

25 Claims, 13 Drawing Sheets

(56) References Cited

U.S. PATENT DOCUMENTS

| | | |
|---|---|---|
| 2009/0199522 A1 | 8/2009 | Hilberer |
| 2010/0155321 A1 | 6/2010 | Sasur et al. |
| 2016/0201625 A1 | 7/2016 | Jokschas et al. |
| 2016/0296860 A1 | 10/2016 | Thalmann et al. |
| 2016/0339364 A1 | 11/2016 | Thalmann et al. |
| 2017/0282104 A1 | 10/2017 | Baum et al. |
| 2017/0292418 A1 | 10/2017 | Thalmann et al. |
| 2019/0030472 A1 | 1/2019 | Soma et al. |

TREATMENT DEVICE FOR TREATING IN PARTICULAR LIQUID FLUIDS, AND TREATMENT UNIT AND CONNECTION HEAD OF A TREATMENT DEVICE

CROSS-REFERENCE TO RELATED APPLICATIONS

This application is a continuation application of international application No. PCT/EP2020/079587 having an international filing date of 21 Oct. 2020 and designating the United States, the international application claiming a priority date of 25 Oct. 2019 based on prior filed German patent application No. 10 2019 128 834.7, and further claiming a priority date of 29 Jan. 2020 based on prior filed German patent application No. 10 2020 102 163.1, the entire contents of the aforesaid international application and the aforesaid German patent applications being incorporated herein by reference.

BACKGROUND OF THE INVENTION

The invention concerns a treatment device, in particular filter device for treatment, in particular filtration, of in particular liquid fluids, in particular fuel, oil or water, in particular of an internal combustion engine, in particular of a motor vehicle, with an exchangeable treatment unit. The invention concerns furthermore a treatment unit as well as a connection head for a treatment device.

WO 2015091665 A1 discloses a filter for filtering in particular liquid fluids, in particular fuel or oil, in particular of an internal combustion engine, with a filter pot in which a filter element is arranged and a filter head comprising an inlet and/or an outlet for the fluid. The filter head and the filter pot are connected to each other by means of a detachable bayonet-type plug-in/rotation connection. The plug-in/rotation connection comprises at least two interacting lock components, one being connected to the filter pot and one to the filter head.

SUMMARY OF THE INVENTION

It is the object of the invention to provide a treatment device with an exchangeable treatment unit in which an exchange of the treatment unit is enabled in a simple and installation space-saving way.

Further objects are providing a treatment unit and a connection head for such a treatment device.

The aforementioned object is solved according to an aspect of the invention by a treatment device, in particular filter device, for a fluid, in particular for a liquid fluid, with an exchangeable treatment unit, which comprises a housing with a housing pot, a housing cover, at least one inlet for the fluid to be treated, and at least one outlet for the treated fluid, and with a connection head that comprises at least one infeed for the fluid to be treated connectable to the at least one inlet and/or at least one drain for the treated fluid connectable to the at least one outlet, wherein the connection head and the treatment unit are connectable to each other by means of a detachable bayonet-type connection device by performing a plug-in/rotation movement about a connection axis of the treatment device, and the connection device comprises at least one housing connection part on the part of the housing and at least one head connection part on the part of the connection head that, for producing a connection of the connection device, are operatively connectable to each other, wherein the housing connection part and the head connection part, in circumferential direction about the connection axis, each comprise at least one mutually complementary functional element that are operatively connectable to each other. The at least one of the mutually complementary functional elements comprises an assembly ramp that passes into a support region that is perpendicular in relation to the connection axis and the other one of the mutually complementary functional elements comprises a slide region adjoined by a support region that is perpendicular in relation to the connection axis, wherein, in a connection end position of the connection device, the two support regions are positioned on top of each other in relation to the connection axis.

The further object is solved according to a further aspect of the invention by a treatment unit for a treatment device, in particular filter device, which comprises a housing with a housing pot, a housing cover, at least one inlet for the fluid to be treated, and at least one outlet for the treated fluid, wherein the treatment unit is connectable to a connection head of the treatment device by means of a detachable bayonet-type connection device by performing a plug-in/rotation movement about a connection axis of a treatment device, and the connection device comprises at least one housing connection part on the part of the housing that is configured for connecting the connection device to at least one head connection part on the part of the connection head, wherein the at least one inlet is connectable to at least one infeed of the connection head for the fluid to be treated and/or the at least one outlet is connectable to at least one drain of the connection head for the treated fluid. The at least one housing connection part comprises at least one functional element that is operatively connectable to at least one complementary functional element of the head connection part, and the least one functional element comprises a support region that is perpendicular in relation to the connection axis.

The further object is solved according to a further aspect of the invention by a connection head for a treatment device, for connection to a treatment unit which comprises a housing with a housing pot, a housing cover, at least one inlet for the fluid to be treated, and at least one outlet for the treated fluid, wherein the connection head of the treatment device is connectable to the treatment unit by a detachable bayonet-type connection device by performing a plug-in/rotation movement about a connection axis of the treatment device, and the connection device comprises at least one head connection part on the part of the connection head that is configured for connection of the connection device with at least one housing connection part on the part of the housing, wherein at least one infeed of the connection head is connectable to the at least one inlet for the fluid to be treated and/or at least one drain of the connection head is connectable to the at least one outlet for the treated fluid. The at least one head connection part is provided therefor that comprises at least one functional element, wherein the at least one functional element is operatively connectable to at least one functional element of the housing connection part and wherein the at least one functional element comprises a support region that is perpendicular in relation to the connection axis.

Beneficial embodiments and advantages of the invention result from the additional claims, the description, and the drawing.

A treatment device, in particular filter device, for a fluid, in particular for a liquid fluid, with an exchangeable treatment unit is proposed, which comprises a housing with a housing pot, a housing cover, at least one inlet for the fluid to be treated, and at least one outlet for the treated fluid, and with a connection head that comprises at least one infeed for the fluid to be treated connectable to the at least one inlet and/or at least one drain for the treated fluid connectable to the at least one outlet. The connection head and the treatment unit are connectable to each other by means of a detachable bayonet-type connection device by performing a plug-in/rotation movement about a connection axis of the treatment device. The connection device comprises at least one housing connection part on the part of the housing and at least one head connection part on the part of the connection head that are operatively connectable to each other for producing a connection of the connection device. In this context, in circumferential direction about the connection axis, the housing connection part and the head connection part each comprise at least one mutually complementary functional element that are operatively connectable to each other.

According to the invention, the at least one of the mutually complementary functional elements comprises an assembly ramp that passes into a support region that is perpendicular in relation to the connection axis, while the other one of the mutually complementary functional elements comprises a slide region adjoined by a support region that is perpendicular in relation to the connection axis. In this context, in a connection end position of the connection device, the two support regions are positioned on top of each other in relation to the connection axis.

In this context, the at least one functional element engages from behind the at least one complementary functional element of the connection device. In this manner, between the at least one functional element and the corresponding complementary functional element a tensile connection can be realized axially in relation to the connection axis.

The at least one functional element can extend advantageously circumferentially in relation to the connection axis for realizing the bayonet-type connection.

Advantageously, the at least one functional element and the corresponding functional element interacting therewith can be embodied to be complementary. In this manner, they can rest on each other areally in the closed position of the connection device. In this way, a force transmission can be improved. A load on the participating components can be further reduced in this way. The components can be dimensioned smaller for transmission of same forces. Due to the course of the two connection parts matched to each other, the axial expansions of the connection parts can be correspondingly reduced. Advantageously, the connection parts can be shaped parts mutually engaging each other. The contours of the at least one functional element and of the corresponding complementary functional element can glide along each other upon opening or closing of the connection device.

According to a beneficial configuration of the treatment device, an end stop, in particular a lock element, can adjoin the respective support region in circumferential direction. In this manner, a defined position of the connection of connection head and treatment unit of the connection device relative to each other can be achieved.

According to a beneficial embodiment of the treatment device, one or a plurality of support regions of at least one of the functional elements can be provided, a total length of it or them in circumferential direction occupying at least 20% of a corresponding circumference on the same radius of the housing connection part and/or of a corresponding circumference on the same radius of the head connection part, preferably at least 23%, especially particularly preferred at least 30%. In this manner, a corresponding large region can be realized that can act in a force transmitting way. Moreover, the forces between the treatment unit and the connection head can act circumferentially more uniformly and better. In addition, greater forces can be transmitted overall in this way. The stability of the connection with the connection device can thus be improved. The mechanical load of the connection device can thus be reduced. This can have a positive effect on the service life.

According to a beneficial embodiment of the treatment device, at least one of the functional elements can comprise at least one lock element of at least one lock safety device, in particular a lock projection or a lock section or a recess, which lock one behind the other, with each other, or in each other in the closed position of the at least one connection device. With the lock safety device, a risk can be reduced that the connection device can be released by an accidental rotation of the treatment unit about the connection axis.

For closing and releasing the at least one lock safety device, the corresponding lock elements can be separated from each other or moved past each other by a corresponding rotation of the treatment unit. For this purpose, it may be required to overcome corresponding locking forces. With such an increased force expenditure upon attachment, it can also be easily detected when the treatment unit is in its correct position.

According to a beneficial embodiment of the treatment device, the connection device can comprise at least one pretension element for realizing a mechanical pretension with which the mutually complementary functional elements can be pressed against each other. In this manner, the connection device can be held under a mechanical tension. Operation-caused vibrations can thus be dampened. Also, operation-caused noises can be reduced. In particular, a possible rattling can be prevented. Moreover, a possible locking force, which must be overcome for closing or opening the locking action, can be generated or increased.

The at least one pretension element can be arranged advantageously at the connection head. In this manner, it can be configured as a lifetime component. It must not be exchanged together with the treatment unit. Alternatively, or additionally, at least one pretension element can be arranged at the housing. It can thus be exchanged together with the treatment unit.

The at least one pretension element can advantageously be elastic. The at least one pretension element can be elastic due to its shape and/or its material composition. Advantageously, the at least one pretension element can comprise or consist of plastic material, in particular elastomer. Advantageously, the at least one pretension element can be or comprise a spring element, in particular a bent wire part. It can be advantageously comprised of an elastic metal.

The at least one pretension element can perform in addition a sealing function. The at least one pretension element can be combined with a seal or seal unit or vice versa. In addition, or as an alternative, the at least one pretension element can be realized with a return flow blocking membrane of the treatment unit or vice versa. With the return flow blocking membrane, advantageously a passage of the housing for fluid, preferably the at least one inlet, can be closed in a flow direction. In this manner, a return flow of the fluid can be prevented.

According to a beneficial embodiment of the treatment device, the treatment unit, in particular the housing cover and/or an end disk of a possible filter element, and the connection head each can comprise at least one correspondence element, in particular a socket, preferably an attachment socket and/or connection socket and/or seal socket and/or cylinder socket, which correspond with each other in pairs when the treatment unit is mounted. In particular, in this context at least one pair of correspondence elements can be arranged inside of at least one other pair of correspondence elements. In this manner, the correspondence elements can be fixed relative to each other radially in relation to the connection axis. As an alternative, the correspondence elements can be arranged in pairs so as to abut, in particular with interposition of a seal device. In this manner, radial position tolerances in relation to the connection axis can be compensated easily.

Advantageously, at least one pair of correspondence elements can delimit a fluid-conducting space radially outwardly and/or radially inwardly.

In a further advantageous embodiment, at least one pair of correspondence elements can be arranged inside of at least one other pair of correspondence elements. In this manner, in the inner pair of correspondence elements, a first fluid-conducting region can be realized, in particular an outlet channel for the fluid.

Between the inner pair of correspondence elements and the outer pair of correspondence elements, advantageously a second fluid-conducting region can be realized, in particular an annular inlet space for the fluid.

The correspondence elements, in particular the pairs of correspondence elements, can be coaxial to the connection axis, respectively. In this manner, they can be positioned more easily relative to each other. Moreover, the fluid-conducting regions can be circumferentially more uniform in this way.

At least one pair of correspondence elements, in particular a radially outer pair of correspondence elements, can circumferentially surround advantageously a plurality of fluid-conducting regions, in particular at least one inlet region and at least one outlet region for the fluid. In this way, the corresponding fluid-conducting regions can be delimited in a simple manner with only one pair of correspondence elements toward the environment. In this context, contact regions between the correspondence elements of a pair can be sealed as needed with only a single seal unit.

Advantageously, the connection parts of the connection device can be arranged radially outwardly of the pair of correspondence elements which can surround circumferentially all fluid-conducting regions. In this manner, the fluid-conducting regions can be separated by only one pair of correspondence elements, as needed with only one seal device, from the connection parts of the connection device, preferably also from the environment. The connection parts of the connection device can thus be protected from fluid in a simple manner.

Advantageously, at least one seal device, in particular an annular seal, preferably an O-annular seal or a combined seal-return flow blocking membrane, can be arranged between the correspondence elements of at least one pair. In this manner, the fluid-conducting region delimited by the at least one pair of correspondence elements the contact region of the connection socket can be sealed better.

Advantageously, between the treatment unit, in particular the end disk of the filter element, at least one spacer can be provided. The spacer can be a plastic spacer. This entails the advantage of the simpler manufacture.

According to a beneficial embodiment of the treatment device, the head connection part and/or the housing connection part can consist of sheet metal or comprise sheet metal. Sheet metal can be present in general as rolled metal in the form of planar, flat sheets or strips in its initial state. Sheet metal can be realized easily with a uniform material thickness. A mechanically stable connection part can be realized from sheet metal even with a relatively minimal material thickness. In this manner, the required installation space, in particular in axial direction, of the connection device can be reduced. Sheet metal can be worked and processed in a simple manner, in particular bent, folded, stamped, cut or welded. Connections between components, in particular crimp connections or weld connections, can be easily realized with sheet metal. Advantageously, at least one of the connection parts can be embodied as formed sheet metal part.

Advantageously, the head connection part and/or the housing connection part can be embodied not as a drawn part but as a simple bent sheet metal part. A bent part requires only low deformation degrees. The connection device can therefore be formed of a hardened material so that the head connection part and/or the housing connection part comprises an improved wear resistance. When forming the head connection part and/or housing connection part, bulges can be mostly prevented when the material is only bent.

Advantageously, an outer annular seal of a seal device can be arranged radially inside the housing connection part. In this manner, with at least one seal device at least one fluid-conducting region of the treatment device can be sealed toward the environment. Advantageously, the outer annular seal projects past the connection device in axial direction by maximally 5 mm upwardly or downwardly. This is advantageous in relation to the installation space utilization because the sealing region utilizes the axial extension of the connection device.

Preferably, the at least one seal device can surround the at least one inlet and the at least one outlet circumferentially in relation to the connection axis. In this manner, with only one seal a plurality of, in particular all, fluid-conducting spaces can be sealed outwardly, in particular toward the environment and/or toward the connection parts of the connection device.

Advantageously, the at least one seal device, in particular an annular seal or an annular seal unit, can be arranged as close as possible to the connection axis, i.e., have a diameter as small as possible. In this manner, a force can be reduced which can be exerted by the at least one seal device in axial direction on the connection device.

The connection parts of the connection device can thus be mechanically relieved. In that the at least one seal device comprises a diameter as small as possible, the required torque for opening or closing the connection device can be reduced. In this way, the required opening or closing forces can be correspondingly reduced. This can have an advantageous effect in respect to ease of servicing and/or the load capacity of the treatment unit.

Advantageously, the at least one seal device can comprise an O-ring or a shaped seal. The seal device can act sealingly advantageously in relation to the connection axis radially, in particular outwardly or inwardly. In addition, or as an alternative, the at least one seal device can act sealingly in axial direction.

The seal groove of the seal unit can be covered at its side which is axially facing away from the filter bellows by a separate cover ring. The cover ring can be connected in this context by means of clamping tabs to the outer seal socket.

In a preferred embodiment, the seal groove of the seal unit is not configured by means of a separate cover ring but as a part of the housing cover as one piece together with the housing cover. This can have an advantageous effect on the load capacity of the treatment unit.

Advantageously, at least one seal device can be arranged at the treatment unit, in particular the housing cover and/or, as needed, the end disk of the filter element. In this manner, the at least one seal device can be exchanged together with the treatment unit.

The at least one head connection part and/or the at least one housing connection part can be realized respectively with a minimal material thickness in comparison to their radial and circumferential expansion in relation to the connection axis. The material thicknesses of the at least one head connection part and of the at least one housing connection part can be similarly sized.

In a further advantageous embodiment, the material thickness of the at least one head connection part and/or of the at least one housing connection part can be advantageously maximally 3 mm, preferably between 1 mm and 2 mm.

The two connection parts can be correspondingly formed from semi-finished product or form parts, in particular bent, folded, creased, cut or stamped or the like. In this manner, the corresponding lock sections can be realized, as needed.

Advantageously, at least one part of the semi-finished product or of the form parts can be provided radially inside of the head connection parts that are formed from semi-finished product or form parts, in particular bent, folded, creased, cut or stamped or the like. Advantageously, the part of the semi-finished product or of the form parts arranged radially inside the head connection parts is closed in circumferential direction. In this way, the stability of the connection device and thus the stiffness and permanent load capacity of the connection between the connection parts can be improved.

The two connection parts can be arranged advantageously radially inside of at least one circumferential wall of the housing and/or of the connection head. In this manner, the bayonet-type connection device can be protected relative to the environment. The connection device can advantageously be arranged in a corresponding connection space between the housing and the connection head.

Advantageously, the at least one functional element can rest against the corresponding complementary support region across an expansion as large as possible, preferably its entire expansion, in circumferential direction and in radial direction in relation to the connection axis. In this manner, a force transmission between the connection parts can be improved. Corresponding guide contours of the at least one complementary support region can slide along corresponding guide contours of the corresponding support region during opening and closing of the connection device.

In a further advantageous embodiment, a material thickness of the at least one head connection part and/or of the at least one housing connection part in circumferential direction can be constant, respectively, at least in the region of the support regions. In this manner, in particular the axial space requirement of the connection device can be reduced.

In a further advantageous embodiment, the at least one support region and at least the support region interacting therewith can have an approximately screw-shaped course about the connection axis. In this manner, the housing connection part upon rotation of the treatment unit in closing rotation direction can be pulled by means of the connection parts at the same time in axial direction toward the connection head. In this way, a combined plug-in/rotation movement can be realized. The gradients of the at least one support region and of the at least one complementary support region can be advantageously identical.

In this manner, a possible pretension element and/or a seal can be axially compressed when closing the connection device. In case of a seal, the sealing function can be improved additionally in this way.

Advantageously, the gradients can correspond to the gradient of a conventional right-hand thread. In this manner, the connection device, as conventional in particular for fuel filters or oil filters, can be closed by rotation of the treatment unit in the right-hand rotation direction and opened in reverse direction.

Advantageously, a height axial in relation to the connection axis, which is traveled upon closing of the bayonet-type connection device, can match an axial distance of a possible seal on the part of one of the connection parts from a corresponding seal surface on the part of the other connection part. In this manner, by the plug-in/rotation connection upon closing of the connection device, the corresponding seal can be positioned at the corresponding seal surface.

Advantageously, at least one of the connection parts can be connected fixedly or detachably to the treatment unit. At least one of the connection parts can be connected fixedly or detachably to the connection head. The at least one connection part can be connected to the connection unit or to the connection head by means of a material-fused and/or frictional and/or form fit connection, in particular by means of a crimp connection, a weld connection, a clamping connection, a lock connection, a plug-in connection, a screw connection and/or an adhesive connection.

Advantageously, the head connection part can be preferably screwed or welded to the connection head. By use of a screw connection, the head connection part can be simply released from the connection head, as needed.

Advantageously, the housing cover can be in particular elastically deformable. It can thus be pressed by excess pressure existing in the housing, in particular upon operation of the treatment device, against the connection head or a cover ring. The connection head can thus support the housing cover. In this way, the requirements in regard to pressure stability of the housing cover can be reduced. The housing cover can thus be realized more simply, in particular of simpler materials.

Advantageously, a plurality of functional elements of the at least one head connection part and corresponding complementary functional elements of the at least one housing connection part can be arranged circumferentially, in particular uniformly distributed, in relation to the connection axis. In this way, a circumferential, in particular uniform, force transmission can be improved. Moreover, as a whole a rotational angle, which is required for closing and opening the connection device, can be reduced. The circumferential expansion of each individual functional element can thus be smaller in comparison to the use of only a single pair of a functional element and a corresponding complementary functional element. In order to achieve a comparable uniform force transmission, a single pair of functional elements would have to extend at least once about the entire circumference.

Advantageously, the treatment device can be a filter device for filtering liquid fluids, in particular fuel, oil or water. The filter device can advantageously be used in an internal combustion engine.

According to a further aspect of the invention, a treatment unit for a treatment device, in particular filter device, is proposed which comprises a housing with a housing pot, a housing cover, at least one inlet for the fluid to be treated, and at least one outlet for the treated fluid. In this context, the treatment unit is connectable by means of a detachable bayonet-type connection device by performing a plug-in/rotation movement about a connection axis of a treatment device to a connection head of the treatment device. Moreover, the connection device comprises at least one housing connection part on the part of the housing that is configured for connecting the connection device to at least one head connection part on the part of the connection head, wherein the at least one inlet is connectable to at least one infeed of the connection head for the fluid to be treated and/or the at least one outlet is connectable to at least one drain of the connection head for the treated fluid.

According to the invention, the at least one housing connection part comprises at least one functional element that is operatively connectable to at least one complementary functional element of the head connection part. Moreover, the at least one functional element comprises a support region that is perpendicular in relation to the connection axis.

According to a further aspect of the invention, a connection head is proposed for such a treatment device in which according to the invention at least one head connection part is provided that comprises at least one functional element wherein the at least one functional element is operatively connectable to the at least one functional element of the housing connection part. In this context, the at least one functional element comprises a support region that is perpendicular in relation to the connection axis.

The advantages and features disclosed in connection with the treatment device according to the invention and its advantageous embodiments apply correspondingly to the treatment unit according to the invention and to the connection head according to the invention and their advantageous embodiments and vice versa.

According to a beneficial embodiment of the treatment unit and/or of the connection head the at least one functional element can comprise an assembly ramp that passes into the support region that is perpendicular in relation to the connection axis. As an alternative, the at least one functional element can comprise a slide region which passes into the support region that is perpendicular in relation to the connection axis.

According to a beneficial embodiment of the treatment unit and/or of the connection head, one or a plurality of support regions can be provided, a total length of it or them in circumferential direction occupying at least 20% of a corresponding circumference on the same radius of the housing connection part, or correspondingly of the connection head, preferably at least 23%, particularly preferred at least 30%.

According to a beneficial embodiment of the treatment unit, the connection part can be fastened to the housing by means of a crimp connection between the housing cover and the housing pot. In addition, the connection part can be fastened to the housing by means of a material-fused connection, in particular a weld connection, to the housing cover and/or to the housing pot. In this manner, the housing connection part can be connected in a stable manner to the treatment unit. It can thus be exchanged simply together therewith.

Advantageously, the housing connection part can be held at the housing by means of a crimp connection formed between the housing cover and the housing pot. Advantageously, a stable cover ring can be arranged on the housing cover. In this context, the housing cover can be matched to the shape of the cover ring in order to achieve a greater tensile strength of the housing connection part.

Beneficially, the head connection part can be fastened by means of a screw connection in the connection head.

The housing connection part can advantageously be flush in axial direction in relation to the axially outermost surface of the crimp connection provided between the housing cover and the housing pot.

Advantageously, the housing cover can be connected by use of sealing material, in particular sealing mass, sealtightly to the housing pot, in particular by means of a crimp connection.

According to a beneficial embodiment of the treatment unit, the housing connection part can consist of sheet metal or comprise sheet metal, in particular can be formed substantially as bent sheet metal part. In particular, the material thickness of the housing connection part, at least in the region of the at least one functional element, can be constant in this context. Correspondingly, the head connection part of the connection head can be embodied analogously.

According to a beneficial embodiment of the treatment unit and/or of the connection head, the at least one functional element each can comprise at least one lock element of at least one lock safety device, in particular a lock projection or a lock section or a recess.

According to a beneficial embodiment of the treatment unit, at the respective support region an end stop and/or a lock element can adjoin in circumferential direction in order to ensure an anti-rotation connection between treatment unit and connection head.

According to a beneficial embodiment of the treatment unit, the housing connection part can be fixedly connected at the outer rim on the housing cover by a cover ring, in particular by material fusion, in particular welded. Advantageously, laser welding or projection welding can be used. Optionally, the connection can also be produced by soldering. Advantageously, a risk of breakage of the housing connection part by loading over the service life, for example, by vibration loading, can be reduced.

According to a beneficial embodiment of the treatment unit, the housing connection part can comprise an anti-rotation device. In particular, the housing connection part can comprise at the rim at least one notch as an anti-rotation device. Advantageously, the anti-rotation device can interact with a rim of the housing pot in the sense of an anti-rotation device.

The housing cover can comprise preferably sheet metal. A material thickness of the housing cover can amount beneficially to 0.4-1 mm. An outer annular seal can be arranged radially inside of the housing connection part. The material thickness of the at least one housing connection part and/or of the head connection part can amount advantageously to maximally 3 mm, preferably between 1 mm and 2 mm.

The at least one functional element can comprise an approximately screw-shaped course about the connection axis, respectively.

Advantageously, the treatment unit can be an exchangeable filter, in particular an exchangeable oil filter or an exchangeable fuel filter. The housing of the treatment unit can then be a filter housing. Advantageously, at least one filter element can be arranged in the filter housing so that it can separate the at least one inlet from the at least one outlet. The connection head can advantageously be a filter head at which the exchangeable filter, in particular the filter housing, can be detachably mounted by means of the connection device.

An exchangeable filter is usually a filter in which the at least one filter element is exchanged together with the filter housing. In general, the at least one filter element is arranged fixedly in the filter housing. Correspondingly, the connections between housing pot and housing cover must not be detachable in a nondestructive way.

The invention is not limited to a treatment device of an internal combustion engine of a motor vehicle. Instead, it can also be used in other types of internal combustion engines, in particular industrial motors. The invention can also be used for other types of treatment devices for fluid within or outside of the automotive technology. The invention can also be used for air/oil separation boxes or drying agent boxes.

BRIEF DESCRIPTION OF THE DRAWINGS

Further advantages result from the following drawing description. In the drawings, embodiments of the invention are illustrated. The drawings, the description, and the claims contain numerous features in combination. A person of skill in the art will consider the features expediently also individually and combine them to expedient further combinations.

DESCRIPTION OF PREFERRED EMBODIMENTS

Figure 1:
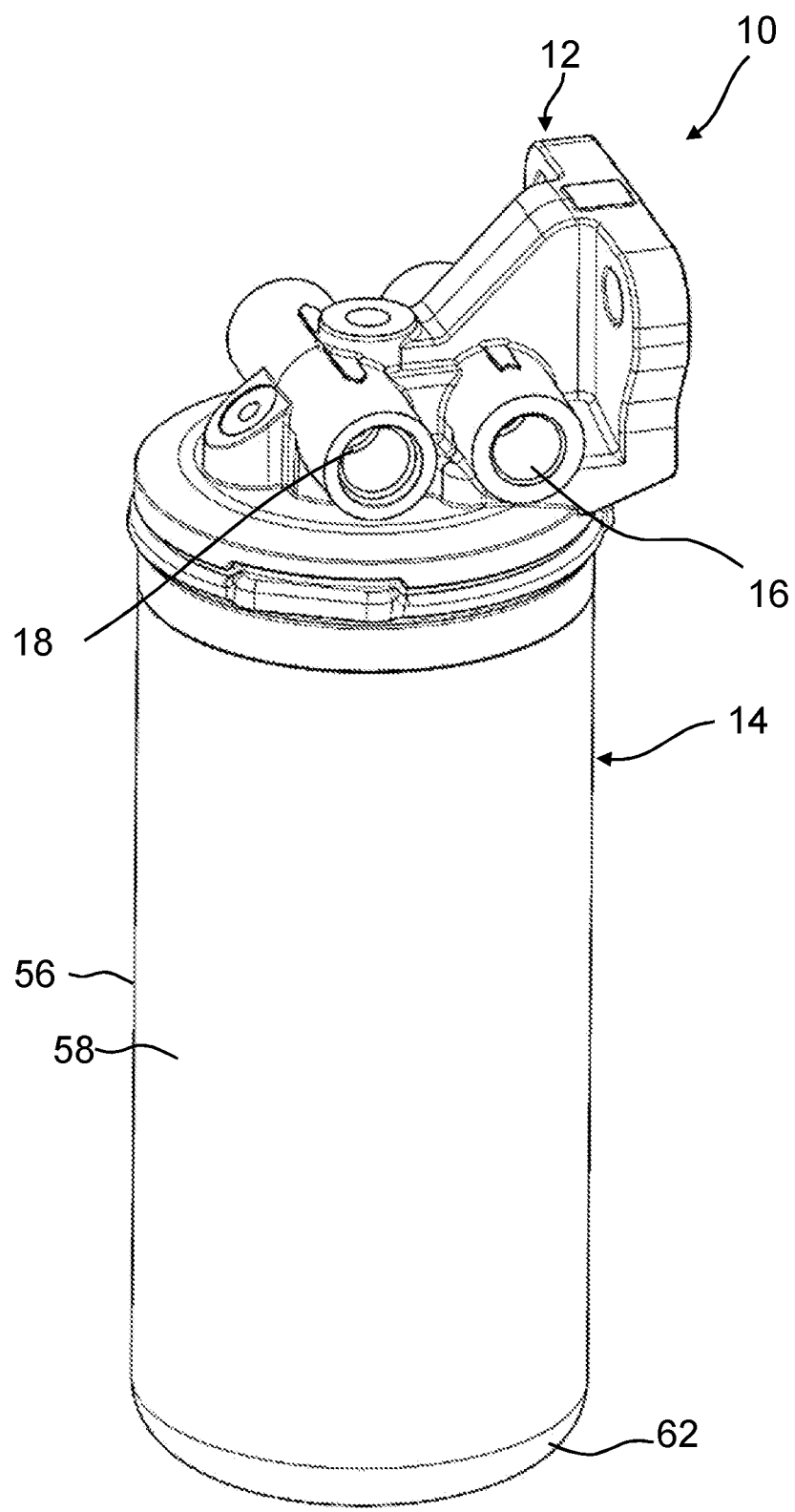
FIG. 1 shows an isometric illustration of a treatment device according to an embodiment of the invention, in particular of a filter device for motor oil of an internal combustion engine of a motor vehicle, with a treatment unit and a connection head.

In the Figures, same or similar components are identified with same reference characters.

In FIGS. 1 to 17, a first embodiment of a treatment device 10 in the form of a filter device for a liquid fluid, for example, motor oil of a motor oil circuit of an internal combustion engine of a motor vehicle, and its components in different perspectives, sections, and detail views is shown. The treatment device 10 serves for purifying the motor oil, for example.

Figure 2:
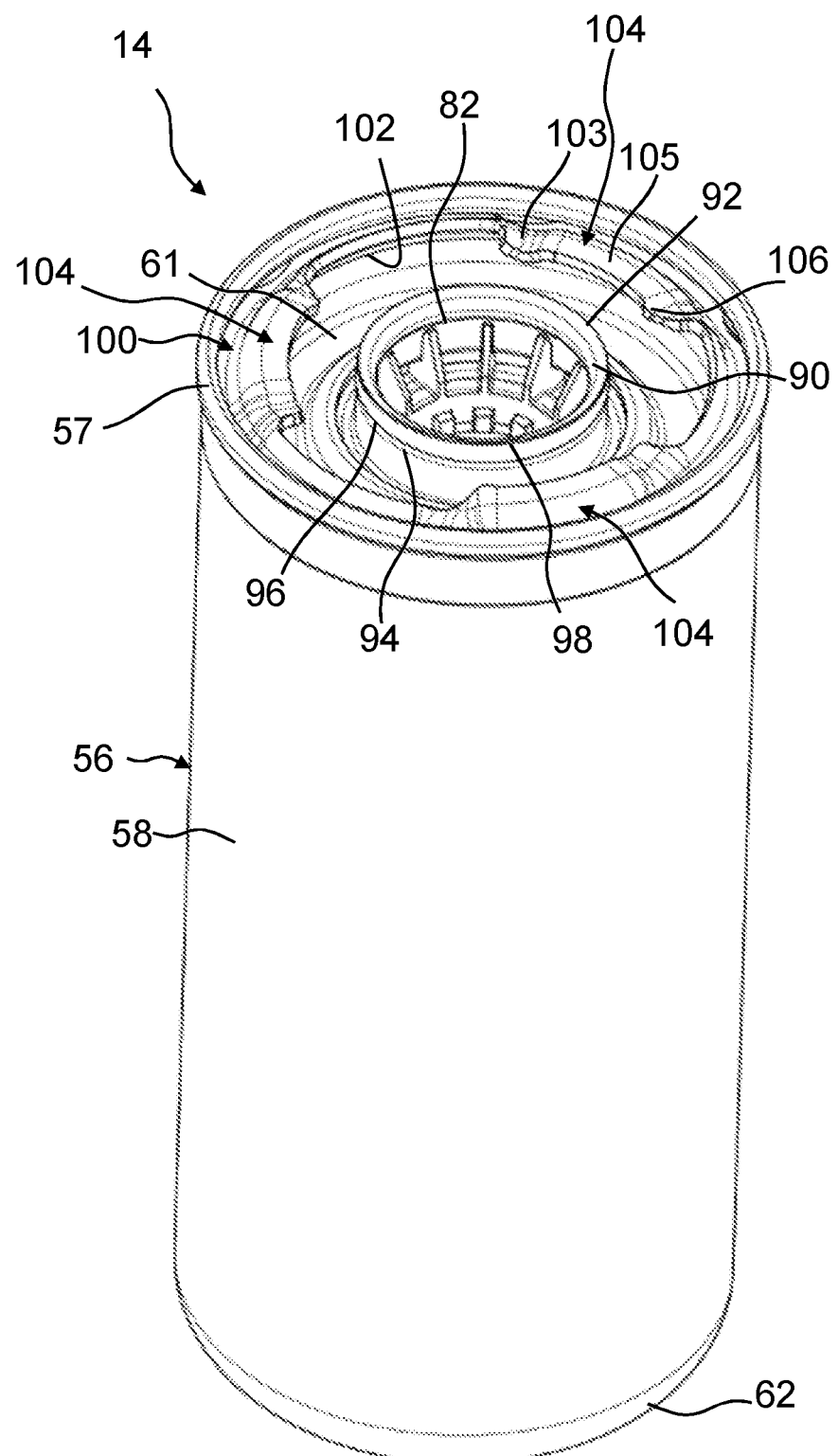
FIG. 2 shows an isometric illustration of the treatment unit according to FIG. 1 with top view of the housing connection part.
Figure 3:
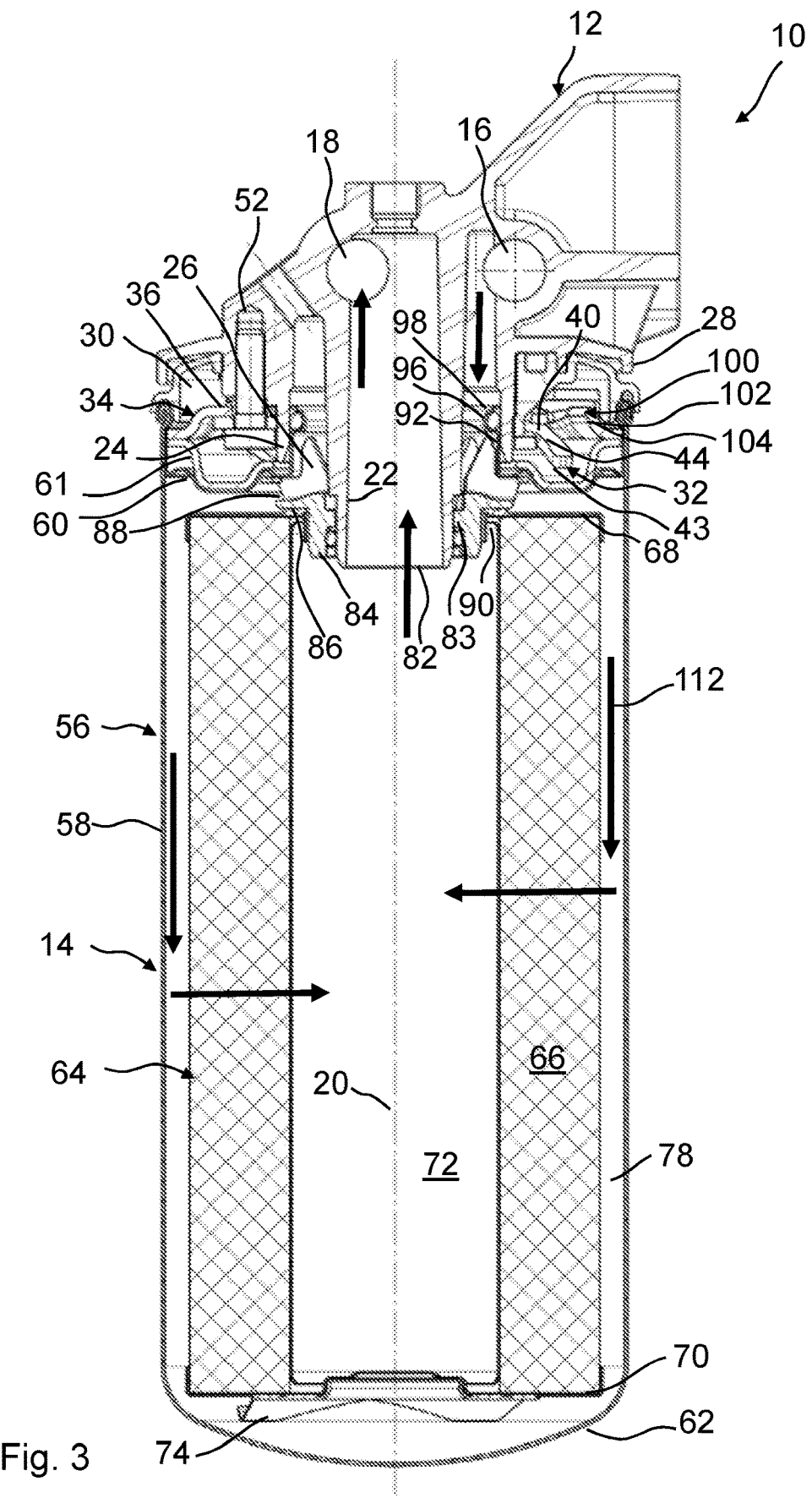
FIG. 3 shows a longitudinal section of the treatment device according to FIG. 1.
Figure 4:
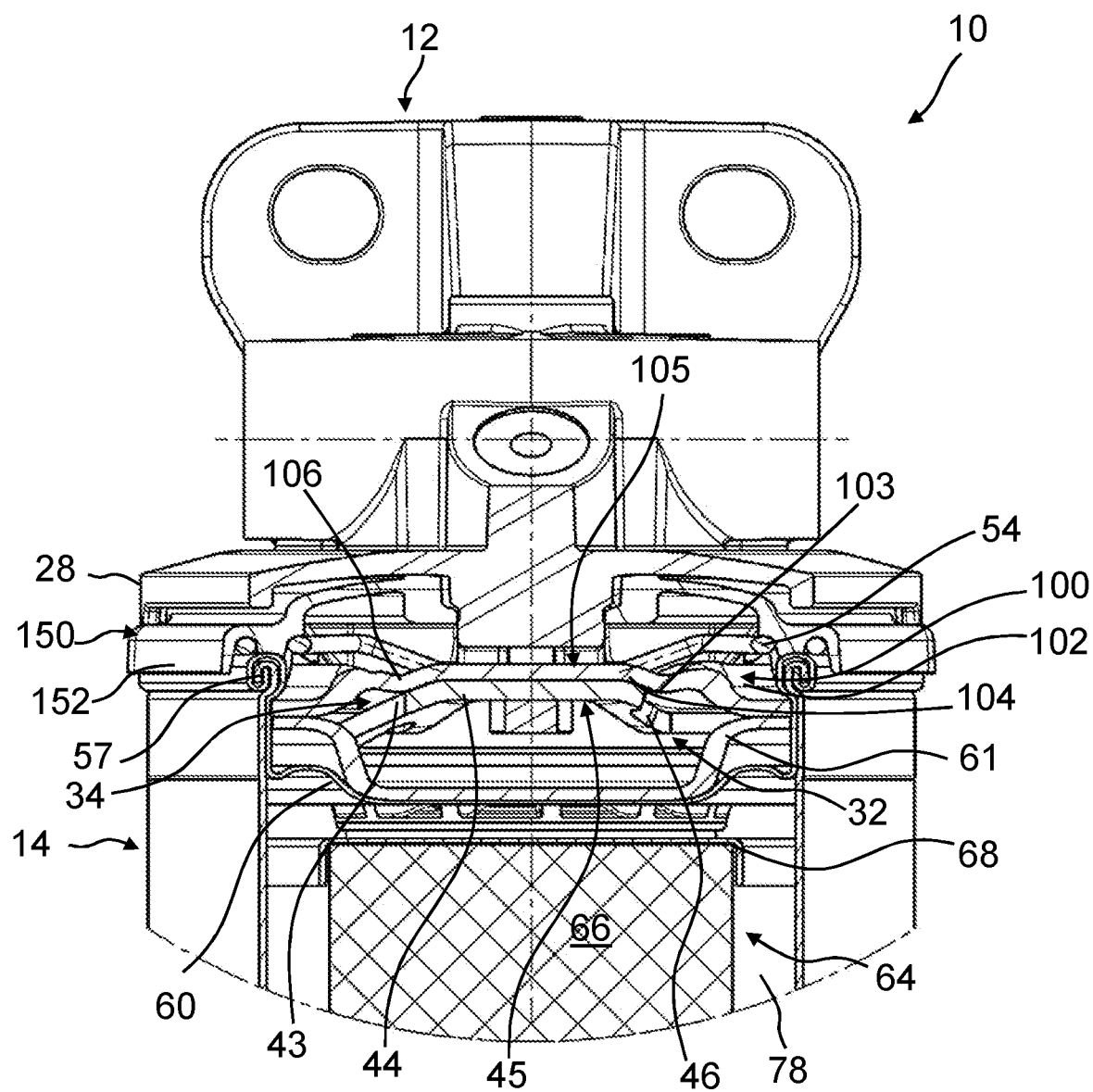
FIG. 4 shows a detail view of the treatment device according to FIG. 1 with sectioned housing.
Figure 5:
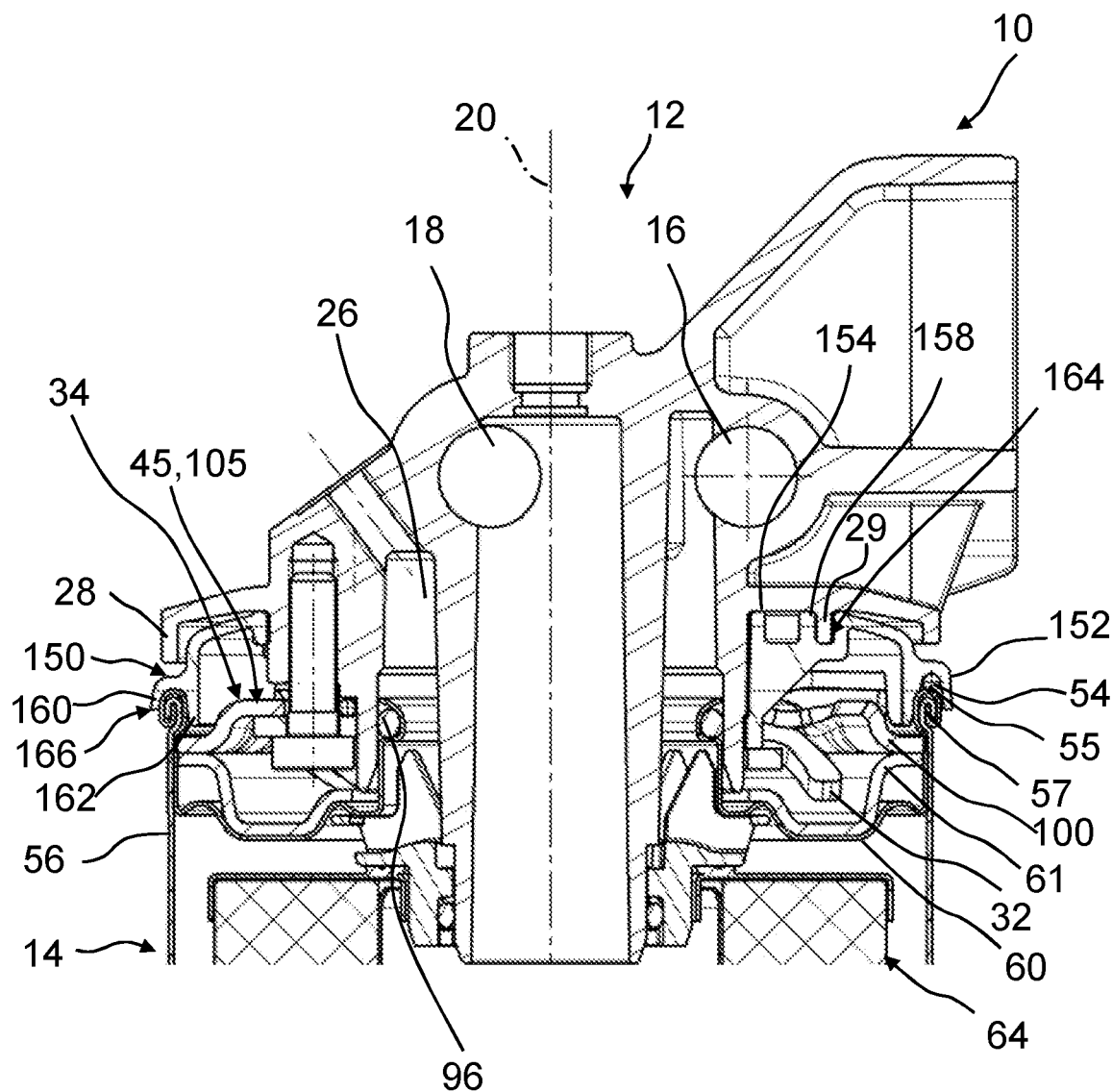
FIG. 5 shows a detail view of the treatment device according to FIG. 1 in the region of the connection head treatment unit as longitudinal section.

FIG. 1 shows an isometric illustration of the treatment device 10 with a treatment unit 14 and a connection head 12. FIG. 2 shows an isometric illustration of the treatment unit 14 with top view of a housing connection part 100. FIG. 3 shows a longitudinal section of the treatment device 10. FIG. 4 shows a detail view of the treatment device 10 with sectioned housing 56. FIG. 5 shows as a longitudinal section a detail view of the treatment device 10 in the region of the connection head 12 and housing 56.

According to a beneficial embodiment of the treatment unit 14, the housing connection part 100 can be fixedly connected at the outer rim to a stable cover ring 61 of the housing cover 60, in particular by material fusion, in particular welded. Advantageously, laser welding or projection welding can be employed. Optionally, the connection can also be produced by soldering. Advantageously, due to the fixed areal connection, a risk of breakage of the housing connection part 100 due to loading that acts over the service life, for example, by vibration loading, can be reduced. Beneficially, the shape of the housing cover 60 can also be matched to the shape of the cover ring 61 in order to achieve a greater tensile strength of the housing connection part 100.

The treatment device 10 comprises the connection head 12 in form of a filter head at which an exchangeable filter as treatment unit 14 is detachably fastened. The connection head 12 is connected fixedly to the internal combustion engine and serves as an attachment part for the treatment unit 14. The connection head 12 is illustrated in two embodiments in detail in FIGS. 6 and 13. The connection head 12 comprises an infeed 16 and a drain 18 for the motor oil. The infeed 16 and the drain 18 are connected to corresponding oil conduits of the internal combustion engine, not explained here in detail.

The connection head 12 comprises moreover an attachment socket 22 that is coaxial and radially inward in relation to a connection axis 20.

When in the following "axial", "radial", "coaxial", "circumferential" or the like is mentioned, this relates to, if nothing to the contrary is indicated, the connection axis 20.

In the illustrated embodiment, the connection axis 20 coincides with a filter axis of the treatment unit 14.

The inner attachment socket 22 is approximately circular cylindrical. It extends on the side of the connection head 12 which is facing the treatment unit 14. It is open at both its end faces. At its side which is facing away from the treatment unit 14, the inner attachment socket 22 is connected in fluid communication to the drain 18.

The inner attachment socket 22 is surrounded coaxially by a circular cylindrical, radially outer attachment socket 24. The inner attachment socket 22 projects in axial direction past the outer connection socket 24 at the side facing the treatment unit 14.

The inner attachment socket 22 and the outer attachment socket 24 delimit respectively circumferentially a coaxial annular inlet space 26. The annular inlet space 26 is connected by a fluid connection to the infeed 16.

The inner attachment socket 22 and the outer attachment socket 24 are surrounded coaxially by a circular cylindrical circumferential wall 28. The free rim of the circumferential wall 28 which is facing the treatment unit 14 is located approximately at the same axial level as the free rim of the outer attachment socket 24. The attachment socket 24 projects past the circumferential wall 28 slightly in the direction toward the treatment unit 14.

Figure 6:
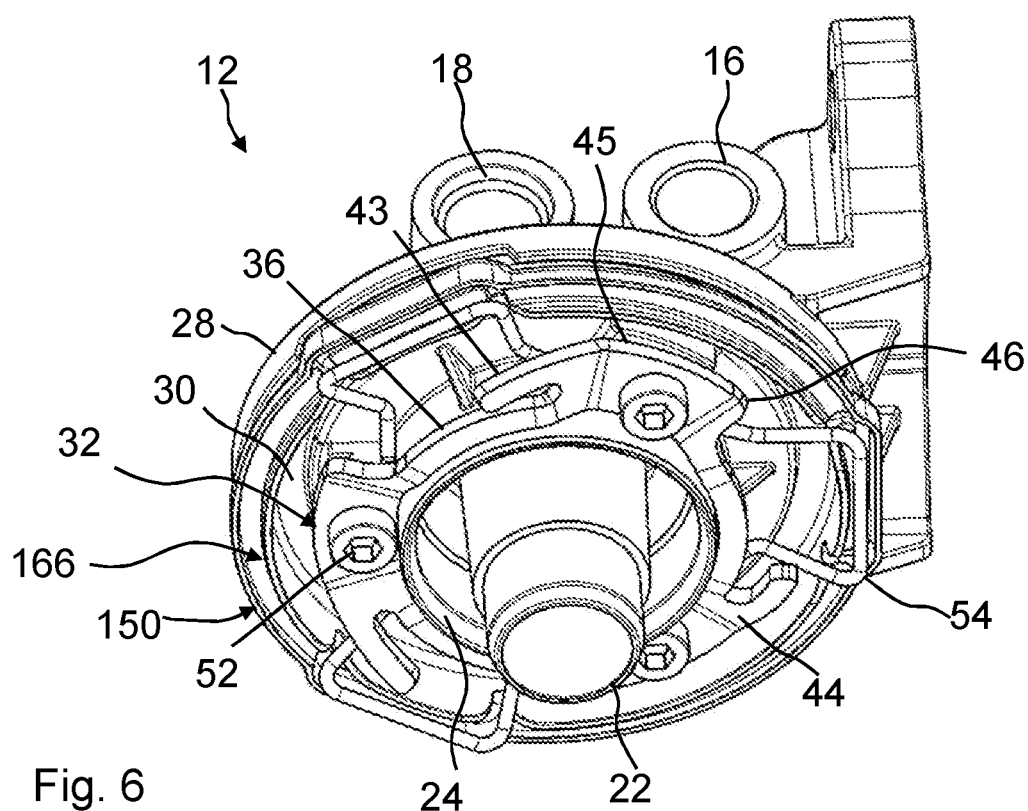
FIG. 6 shows an isometric illustration of the connection head of the treatment device according to FIG. 1 with a view of the head connection part in the interior of the connection head.
Figure 7:
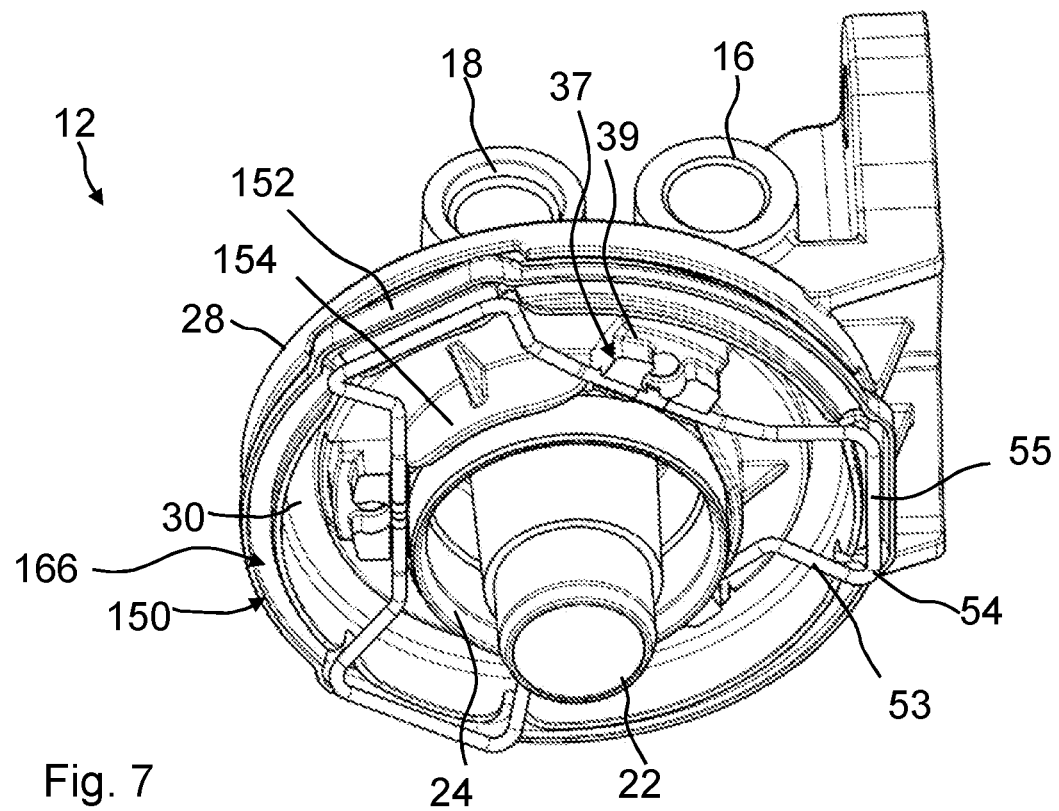
FIG. 7 shows the connection head according to FIG. 6 with exposed pretension element without head connection part.
Figure 8:
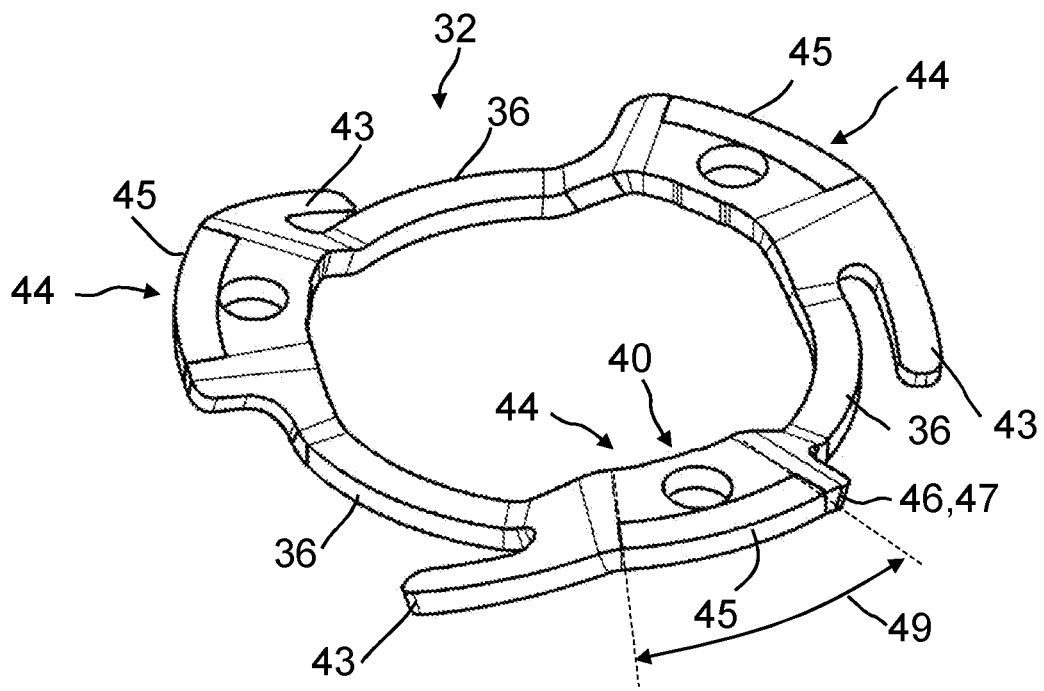
FIG. 8 shows an isometric illustration of the head connection part according to FIG. 6.
Figure 9:
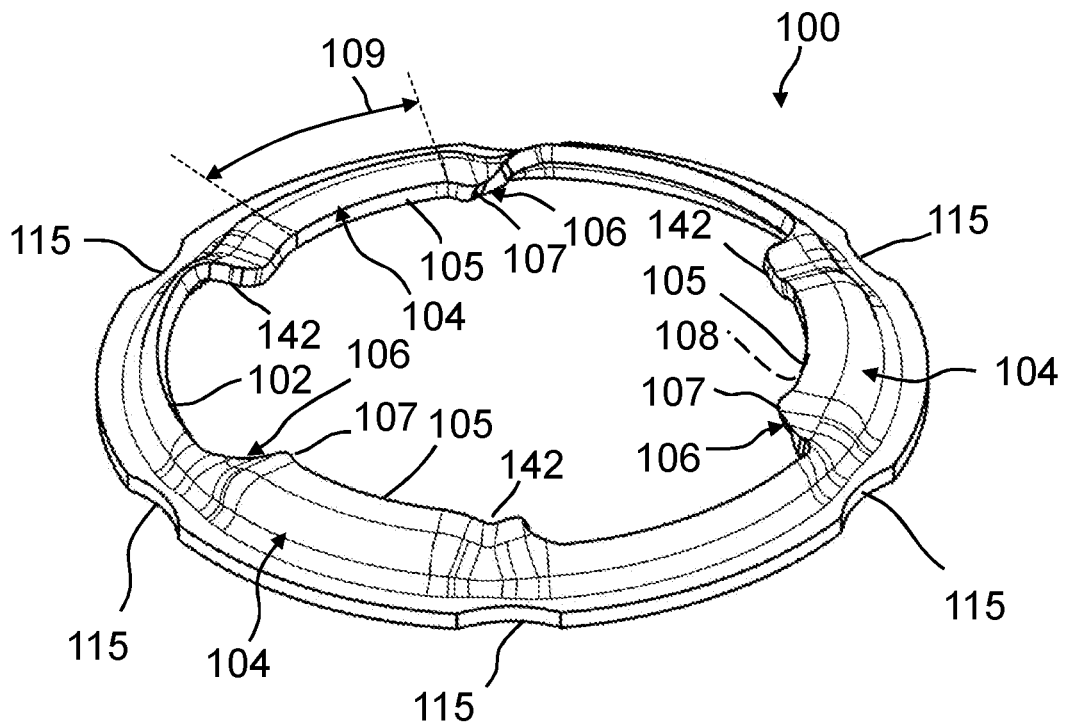
FIG. 9 shows an isometric illustration of the housing connection part according to FIG. 2.
Figure 10:
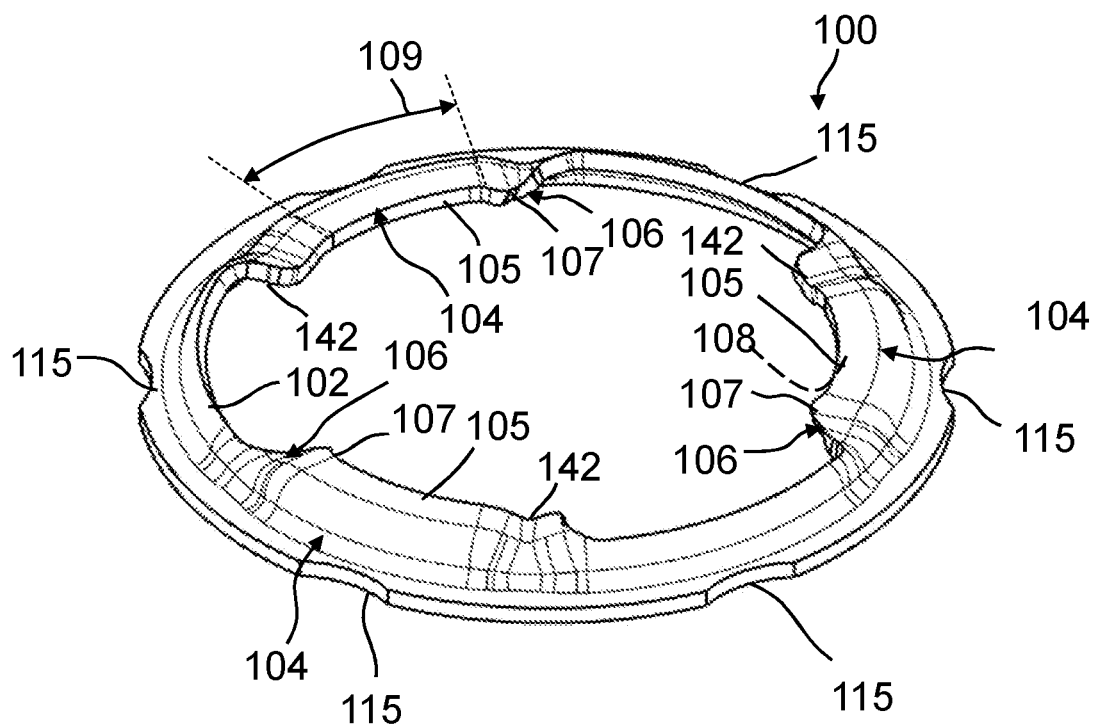
FIG. 10 shows an isometric illustration of a variant of the housing connection part according to FIG. 9.

FIG. 6 shows an isometric illustration of the connection head 12 of the treatment device 10 according to FIG. 1 with a view of the head connection part 32 in the interior of the connection head 12. FIG. 7 shows the connection head 12 with exposed pretension element 54 without head connection part 32. FIG. 8 shows an isometric illustration of the head connection part 32 according to FIG. 6. FIG. 9 shows an isometric illustration of the housing connection part 100 that is complementary thereto and is illustrated in FIG. 10 in a variant.

Figure 13:
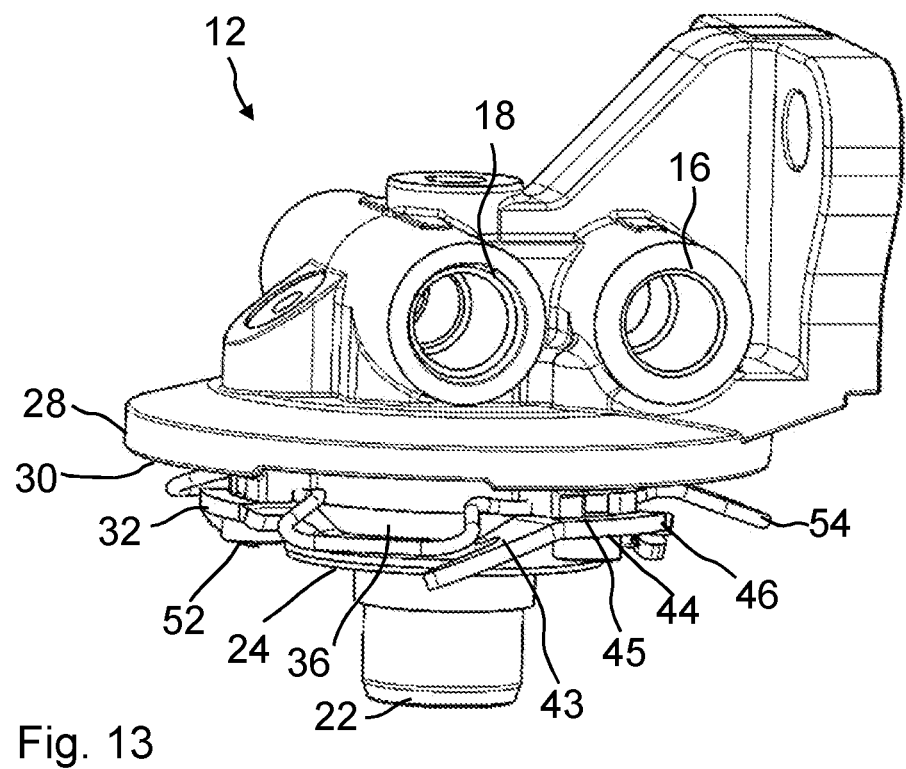
FIG. 13 shows an isometric illustration of a connection head for a treatment device according to FIG. 1 without splash guard with recognizable pretension element.

In the embodiment of the connection head 12 according to FIG. 6, the circumferential wall 28 forms a radially outer boundary of an axially outer part of the connection head 12 at the side which is facing away from the treatment unit 14. A splash guard part 150 is arranged so as to be partially covered by the circumferential wall 28. The splash guard part 150 is manufactured, for example, of vulcanized elastomer or thermoplastic elastomer (TPE). The splash guard part 150 and the outer attachment socket 24 each delimit circumferentially an annular coaxial connection space 30. In FIG. 13, a connection head 12 of the same configuration without splash guard part is illustrated.

In the connection space 30, a head connection part 32 of a detachable bayonet-type connection device 34 is arranged. By means of the connection device 34, the treatment unit 14 is detachably fastened to the connection head 12. For this purpose, a complementary housing connection part 100 is arranged in the treatment unit 14.

The overall approximately annular head connection part 32 is preferably formed of sheet metal. The thickness of the sheet metal is constant at approximately 2 to 3 mm.

Radially inwardly, the head connection part 32 comprises an annular head assembly section 36. The head assembly section 36 abuts with its radial inner circumferential side approximately against the radially outer circumferential side of the outer attachment socket 24. The head assembly section 36 extends radially and circumferentially approximately in a plane. The head connection part 32 extends radially approximately to the center of the connection space 30.

The head assembly section 36 in this example passes into three head-side functional elements 44 in the form of bayonet sections which can be seen in the detail illustration of FIG. 8. In place of the three functional elements 44, also four or five can be provided.

Advantageously, the head connection part 32 and/or the housing connection part 100 can be embodied not as a drawn part but as a simple bent sheet metal part. A bent part requires only minimal deformation degrees. The connection device 34 can be formed of a harder material so that the head connection part 32 and/or the housing connection part 100 exhibit an improved wear resistance. When forming head connection part 32 and/or housing connection part 100, bulges can be mostly prevented when the material is only bent.

In the unformed state, the head assembly sections 36 of the head connection part 32 are, for example, not of a circular section shape as in FIG. 8 but in radial direction slightly curved outwardly. In particular, the head assembly sections 36 can have a slightly different, in particular larger, diameter than the circumferential section 40. Typically, the difference in diameters can lie at approximately 1 mm. When bending the sheet metal, the material shrinks only in the head assembly sections 36 so that the head assembly sections 36 pull radially inwardly. The supporting regions of the functional elements 44, on the other hand, remain practically unaffected. The housing connection part 100 comprises only a minimal curvature so that the housing connection part 100 comprises an axial extension of only a few millimeters, for example, maximally 6 mm, preferably maximally 4 mm, particularly preferred maximally 3 mm.

The head assembly sections 36 have in radial direction a reduced width compared to the head-side bayonet sections in the form of the functional elements 44. The head-side functional elements 44 are identical in shape and size. The head-side functional elements 44 are arranged uniformly distributed in circumferential direction. The head-side functional elements 44 each comprise a circumferential section 40 which extends substantially circumferentially parallel to an imaginary circular cylinder wall about the connection axis 20. The circumferential section 40 comprises a flat support region 45 that is arranged perpendicularly to the connection axis 20. The respective functional element 44 comprises an assembly ramp 43 extending in axial direction at a slant and passing into the flat support region 45 that ends at a lock element 46 as an end stop 47 adjoined by a recess relative to the neighboring head assembly section 36.

The circumferential sections 40 connect thus the head assembly sections 36 to the respective assembly ramps 43. The assembly ramps 43 are easily visible in particular in FIG. 8.

Each one of the flat support regions 45 comprises an extension 49 in circumferential direction. The flat support regions 45 of all functional elements 44 of the head connection part 32 occupy a total length in circumferential direction of at least 20% of a corresponding circumference on the same radius of the head connection part 32, preferably at least 23%, particularly preferred at least 30%.

The assembly ramps 43 each have an approximately screw-shaped course about the connection axis 20. The gradient of the assembly ramps 43 extending at a slant corresponds approximately to the gradient of a conventional right-hand thread. Viewed axially from the treatment unit 14, the free ends of the assembly ramps 43 leading in clockwise direction are closer to the treatment unit 14 than the rearward ends in clockwise direction, respectively. Between the leading ends of the assembly ramps 43 and the plane of the head assembly section 36, there is a respective gap through which the corresponding complementary housing-side functional elements 104 in the form of bayonet sections can be inserted, which will be explained in more detail below.

The sheet metal of the head connection part 32 is of the same thickness in the head assembly section 36, in the circumferential sections 40, and in the assembly ramps 43. This means also that it has a uniform axial expansion in the head assembly section 36 and in the assembly ramps 43.

The functional elements 44 each comprise a head-side lock projection 46. The lock projections 46 are realized as respective bends in the functional elements 44. The lock projections 46 project axially at the side which is facing the treatment unit 14.

The treatment unit 14 is detachably fastened at the connection head 12 by means of the connection device 34. For this purpose, a complementary housing connection part 100 that comprises complementary functional elements 104 is arranged in the treatment unit 14. FIG. 9 shows an isometric illustration of the housing connection part 100 according to FIGS. 2-5 that interacts with the head connection part 32. In FIG. 10, a variant of the housing connection part 100 is illustrated.

The housing connection part 100 of the connection device 34 is formed as an annular coaxial element preferably from sheet metal. A thickness of the sheet metal of the housing connection part 100 corresponds approximately to the thickness of the sheet metal of the head connection part 32.

The housing connection part 100 extends radially from the radially outer circumferential side of a stable cover ring 61 arranged on the housing cover 60 (FIGS. 4, 5) past the radial center of the connection space 30. The housing connection part 100 overlaps the head connection part 32. The cover ring 61 absorbs the inner pressure of the treatment unit 14.

The housing connection part 100 comprises a housing assembly section 102 which extends radially and circumferentially approximately in a plane. The housing assembly section 102 is fixed radially outwardly axially between the housing cover 60 and a crimp connection as a rim 57 of the housing pot 58 to the housing cover 60. It is resting on a side flat against the cover ring 61 at the housing cover 60. The assembly section 102 can be connected by material fusion to the cover ring 61 at the rim, for example, can be welded.

The housing assembly section 102 passes on its radially inner side into three identical housing-side functional elements 104 in the form of bayonet sections. The housing-side functional elements 104 are arranged uniformly distributed in circumferential direction. They have approximately the shape and size of the head-side functional elements 44 that are complementary thereto. Instead of the three functional elements 104, also four or five can be provided.

The housing-side functional elements 104 act complementarily to the functional elements 44 and comprise each a flat support region 105 as well as a slide region 142 at a circumferential end of the support region 105 and an end stop 107 in the form of a small slightly inwardly projecting pin as well as a lock element 106 at the oppositely positioned circumferential end of the support region 105. The end stop 107 abuts at an edge 37 of a threaded element 39 (FIG. 7) in the connection head 12 and prevents excess rotation during assembly. When producing the connection between head connection part 32 and housing connection part 100, the slide regions 142 slide on the assembly ramps 43 of the housing-side head connection part 32. The lock elements 106 enable locking of the housing connection part 100 at the lock elements 46 of the head connection part 32.

The respective flat support region 105 comprises a contact surface 108 which is arranged at the side of the support region 105 that is not visible in FIG. 9 and which, when the connection is produced with the head connection part 32, rest against the straight support regions 45 of the functional elements 44. Each flat support region 105 comprises an extension 109 in circumferential direction. The flat support regions 105 of all functional elements 104 occupy a total length in circumferential direction of at least 20% of a corresponding circumference on the same radius of the housing connection part 100, preferably at least 23%, especially particularly preferred at least 30%.

The contact surfaces 108 of the straight support regions 105 are located at the side of the respective housing-side functional element 104 which is facing the cover ring 61 of the housing cover 60. In the closed state of the connection device 34, the contact surfaces 108 are engaged from behind for interaction by one of the head-side functional elements 44, respectively. In this context, the contact surfaces 108 of the straight support regions 105 are resting flat against the corresponding flat regions 45 of the functional elements 44.

At its outer circumference, the housing connection part 100 comprises notches 115 which in the mounted state provide an anti-rotation protection. In the embodiment according to FIG. 9, the notches 115 are arranged at both sides of the functional elements 104. In the embodiment according to FIG. 10, the notches 115 are rotated by approximately 30° and arranged approximately centrally in the straight section 105 and the housing assembly section 102, respectively.

Due to the crimp connection between housing cover 60 and the housing pot 58, the crimp pulls the housing cover 60 into the notches 115 so that a robust anti-rotation safety is provided.

The housing-side functional elements 104 each comprise a housing-side lock projection 106. The lock projections 106 projects axially away from the cover ring 61 of the housing cover 60. When the treatment unit 14 is mounted, the housing-side lock projections 106 lock behind the corresponding head-side lock projections 46.

For attachment, the treatment unit 14 is pushed, with the housing cover 60 or the cover ring 61 of the housing cover 61 leading, coaxially onto the attachment side of the connection head 12.

Figure 11:
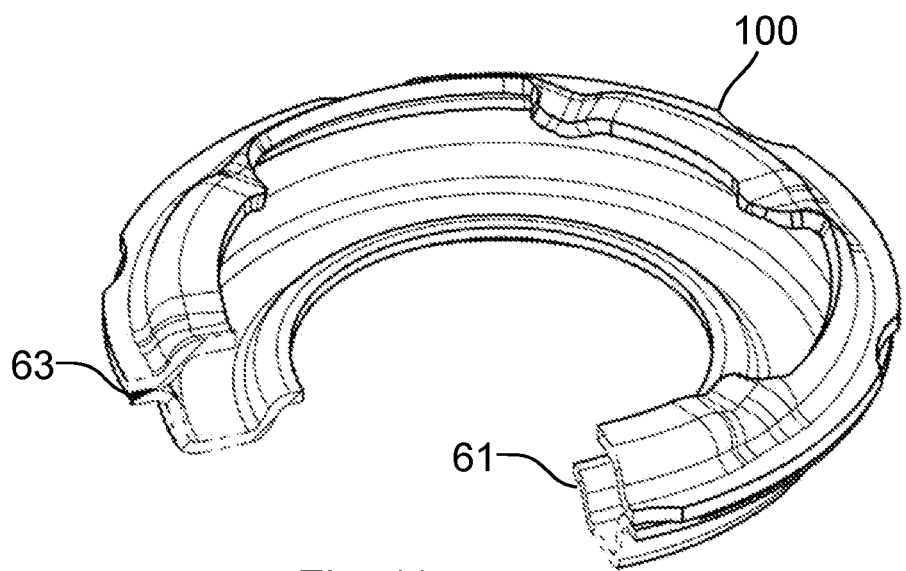
FIG. 11 shows a partially sectioned illustration of a variant of the housing connection part according to FIG. 10 connected with a cover ring of the housing cover.
Figure 12:
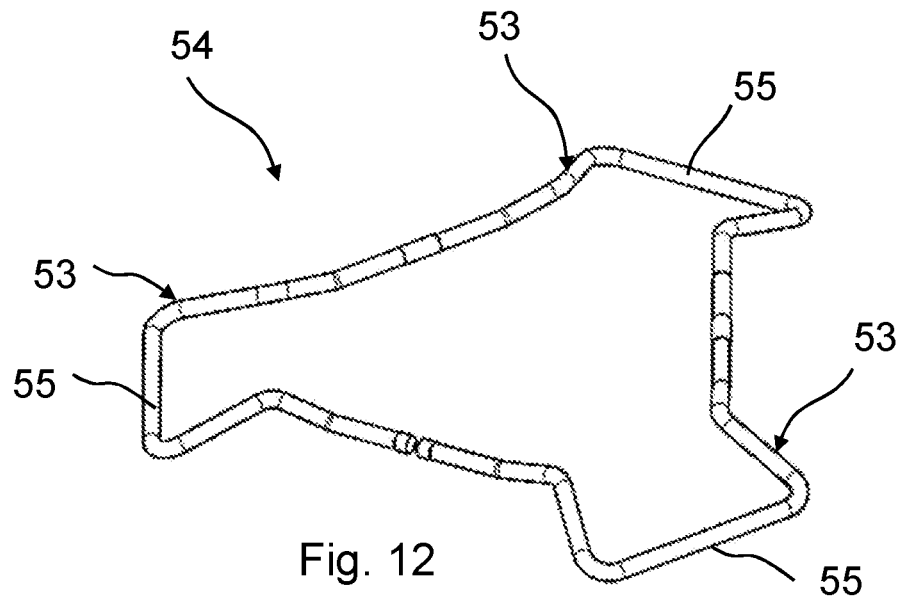
FIG. 12 shows a top view of the pretension element according to FIG. 6.

FIG. 11 shows a partially sectioned illustration of a variant of the housing connection part 100 according to FIG. 10 that is fixedly connected at the outer rim 63 to a cover ring 61 of the housing cover 60, for example, is welded. Advantageously, laser welding or projection welding can be employed. Optionally, the connection can also be produced by soldering. Advantageously, due to the fixed areal connection, a risk of breakage of the housing connection part 100 due to loading acting over the service life, for example, by a vibration load, can be reduced. In the embodiment illustrated in FIG. 11, the outer rim 63 of the cover ring 61 is extended upwardly in order to form the connection with the housing connection part 100. From the outer rim 63 radially inwardly, the cover ring 61 has a depression whose inner rim is extended upwardly also. In this manner, a great stiffness of the cover ring 61 can be achieved. The housing connection part 100 and the cover ring 61 are positioned in the outer region. The outer rim 63 is the region in which the parts are melted in order to connect them. Even in case of a non-welded embodiment, the inner rim of the depression is extended upwardly also.

The head connection part 32 is fastened to the connection head 12 at the head assembly section 36 with a total of three screws 52, as illustrated in FIGS. 6 to 8, from the side that is facing the treatment unit 14. The screws 52 are located centrally in the circumferential sections 40, respectively, and are screwed into the threaded elements 39 (FIG. 7).

In the connection space 30, moreover a pretension element 54 is coaxially arranged. The pretension element 54 can be seen in detail in FIG. 12. FIGS. 6 and 7 permit viewing of its installed position in the head connection part 32. In the connection head 12, the pretension element 54 is placed with slight clearance into a groove and secured by the screwed-on head connection part 32. In this way, the open spring ends of the pretension element 54 are secured also.

The pretension element 54 is embodied as a bent wire part and is resting against two to five regions at the connection head 12 or at the motor or vehicles side and against two to five regions at the rim 57 of the housing pot 58 of the treatment unit 14. The rim 57 of the housing pot 58 can be embodied as a crimp, for example. The support region of the pretension element 54 relative to the rim 57 of the treatment unit 14 has a straight region 55 which is embodied 10 tangentially to the rim of the housing pot 58. The contour of the outwardly oriented spring arm 53 corresponds approximately to a rectangle or trapezoid. In this way, for each contact region of the spring arms 53, three contact points are provided: two contact points where the respective spring arm 53 crosses the rim 57 and one contact point at the center of the straight region 55. The pretension element 54 is shaped such that the spring arms 53 are resting as flat as possible on the rim 57 of the housing pot 58, for example, the crimp.

The pretension element 54 comprises at least two, in this embodiment three spring arms 53. The spring arms 53 are distributed uniformly about the circumference. The spring arms 53 extend in relation to the connection axis 20 in the same rotational direction as the assembly ramps 43 of the head connection part 32. They are bendable in axial direction in a spring-elastic manner.

In operation, a slight relative movement between pretension element 54 and rim 57 is generated due to vibrations. The straight region 55 enables a more uniform contact and thus a more uniform wear as well as a reduced digging in of the pretension element 54. A reduced detachment moment is also realizable. Moreover, a scaling to different diameters of treatment units 14, which produce different vibration loads due to different masses, can be achieved.

Figure 14:
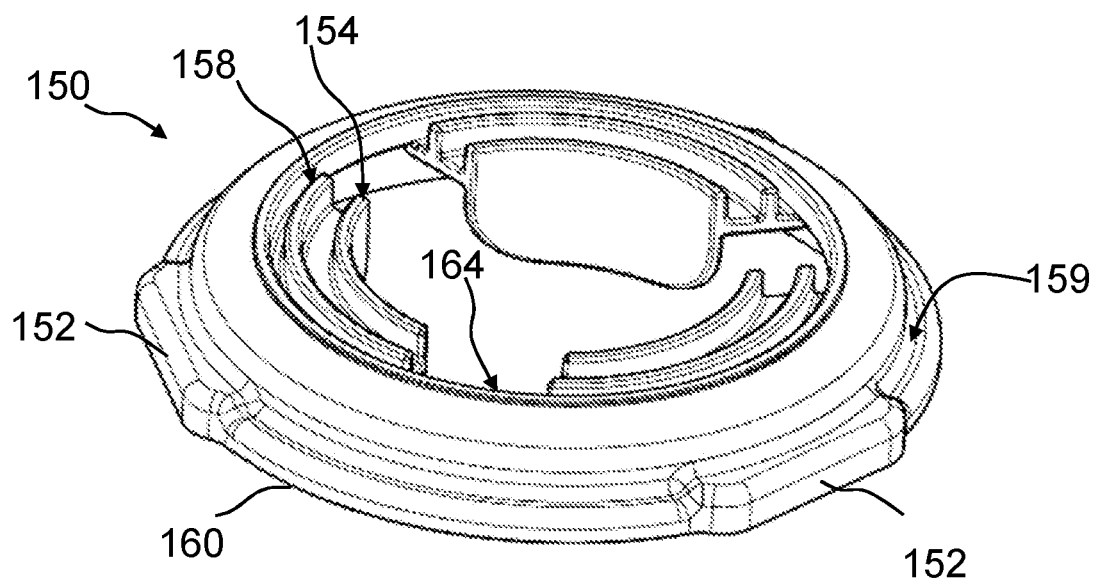
FIG. 14 shows an isometric illustration of the splash guard for the head connection part according to FIG. 6 with a view of its exterior side.
Figure 15:
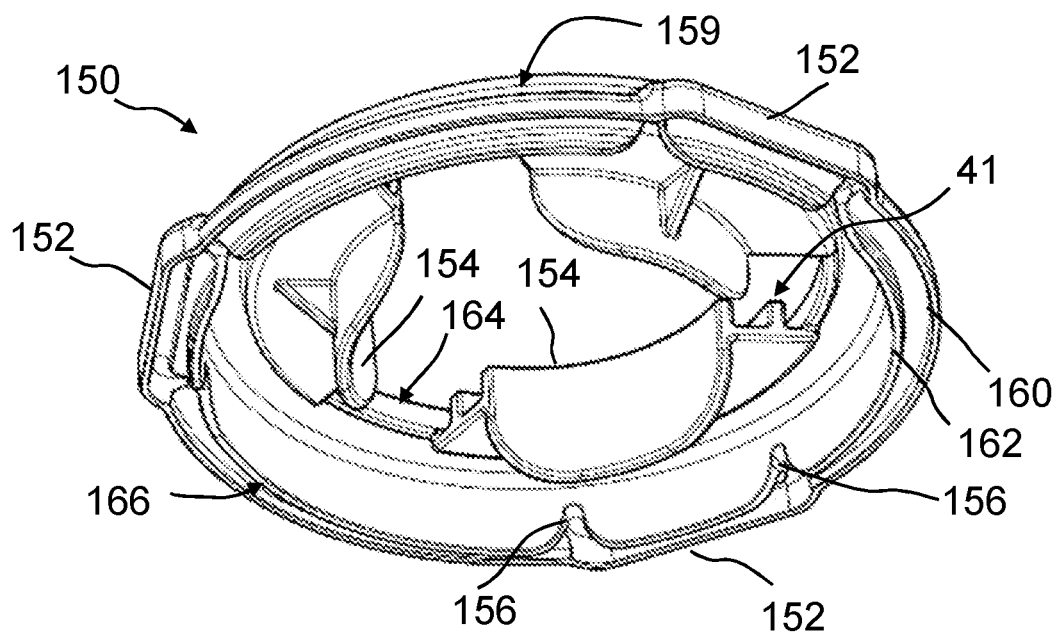
FIG. 15 shows an isometric illustration of the splash guard for the head connection part according to FIG. 6 with a view of its interior side.
Figure 16:
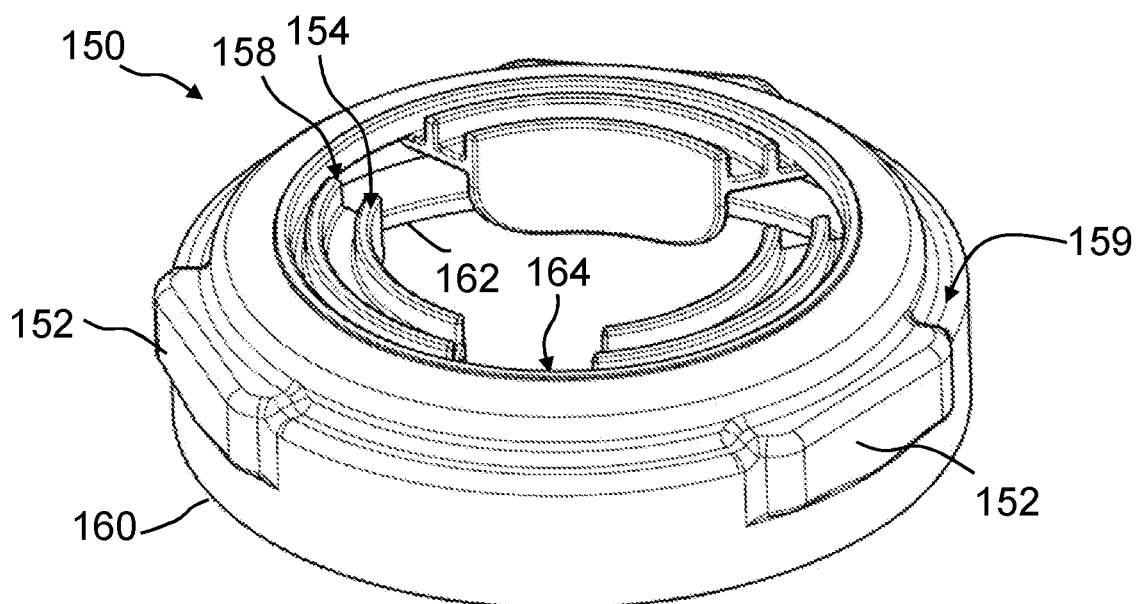
FIG. 16 shows an isometric illustration of a variant of the splash guard for the head connection part according to FIG. 6 with a view of its exterior side.
Figure 17:
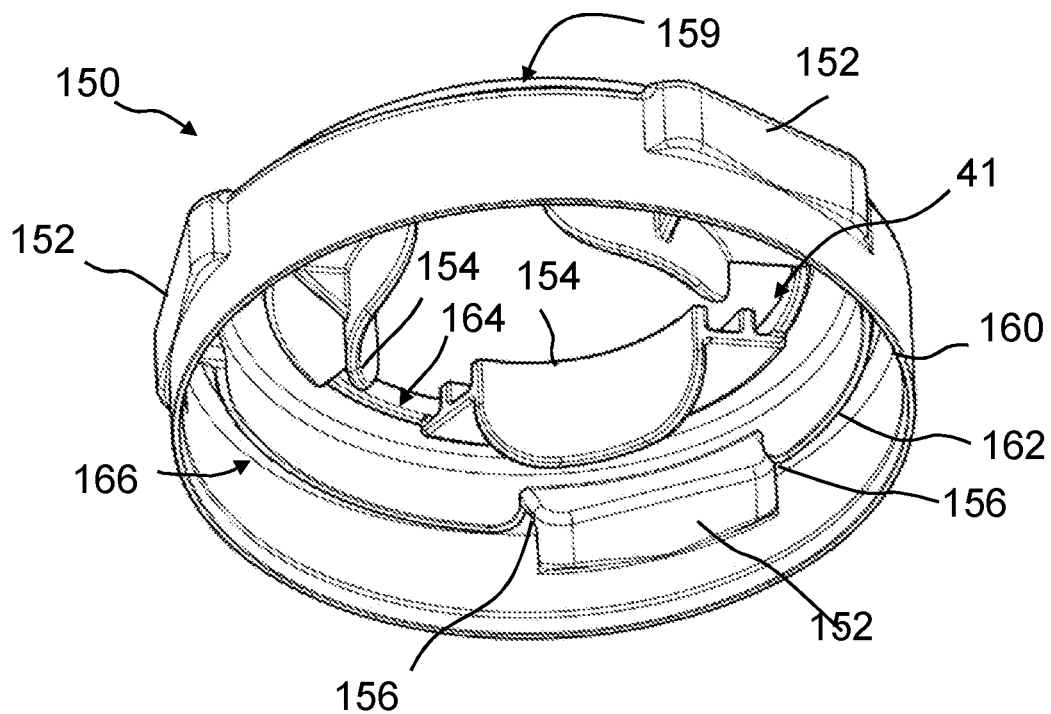
FIG. 17 shows an isometric illustration of a variant of the splash guard for the head connection part according to FIG. 6 with a view of its interior side.

According to the embodiment of the connection head 12 in FIGS. 1 to 17, the circumferential wall 28 surrounds an upper part of the annular splash guard part 150. The splash guard part 150 is illustrated in FIGS. 14 and 15 in two different views. FIGS. 16 and 17 show a variant of the splash guard part 150 in same views.

The splash guard part 150 serves for protection of the functional elements 44, 104 from splashing water and dust. The splash guard part 150 is formed from a vulcanized elastomer or a thermoplastic elastomer (TPE) and seals preferably radially against the connection head 12 and preferably axially against the rim 57 of the treatment unit 14. In the region of the support of the spring arms 53 of the pretension element 54, small cutouts 156 in the form of a groove are provided. Relative to the connection head 12, the splash guard part 150 is preferably held and clamped by the head connection part 32. As an alternative, the splash guard part 150 can also be joined to the connection head 12.

At the connection head 12, a cylindrical shoulder 29 is provided circumferentially which comprises an oversize in relation to the counter contour with the seal region 164 at the splash guard part 150 so that the splash guard part 150 is seated thereat with pretension for an improved sealing action. The seal region 164 seals preferably in radial direction against the shoulder 29. As an alternative, in an embodiment not illustrated the seal region 164 can be designed instead to seal in axial direction.

The splash guard part 150 projects outwardly circumferentially past the rim 57 with a lip 160. Within the rim 57, a further lip 162 is provided that serves during mounting for centering. The lips 160, 162 form a seal region 166 that preferably seals axially against the rim 57. The seal region 164 comprises a smaller diameter than the seal region 166. The lips 160, 162 extend approximately with the same length in axial direction, wherein the inner lip 162 extends axially slightly farther than the outer lip.

In addition, the splash guard part 150 can be supported by the circumferential wall 28 at the connection head 12 which additionally shields against splash water and protects the splash guard part 150 from mechanical damage.

The splash guard part 150 has an umbrella-type shape. It seals in this context on a small diameter against the connection head 12 and on a large diameter against the rim 57. In the regions in which the spring arms 53 of the pretension element 54 project toward the rim 57, the splash guard part 150 comprises a respective bulge 152 which covers the respective spring arm 53. In this context, in the closed state of the connection device 34, the outer straight section 55 of the spring arms 53 of the pretension element 54 is received in a groove between lips 160, 162 of the splash guard part 150. Between the seal regions 164 and 166, the splash guard part 150 comprises a membrane-type flexible region 159 that can be comprised of relatively thin material that is thinner than the material of the seal regions 164, 166. The improved flexibility and deformability in this region 159 facilitates mounting of the treatment unit 14 because reduced deformation forces and a reduced friction moment are acting during mounting at the filter head.

The region 164 between seal to the connection head 12 and the region 166 of the support relative to the rim 57 is preferably outwardly curved as in case of a membrane, with a reduced wall thickness for good deformability. The splash guard part 150 is pushed upwardly by approximately 1-4 mm when mounting the treatment unit 14. In the interior region, ribs 154, 158 can be provided that additionally clamp the splash guard part 150. The ribs 154, 158 are interrupted at the locations at which the thread elements 39 are arranged.

In the embodiment of the splash guard 150 in FIGS. 16 and 17, it can be seen that the outer lip 160 extends in axial direction significantly farther than the inner lip 162, arranged at the rim 57 of the housing pot 58 (FIG. 5). Since the outer lip 160 projects significantly axially past the rim 57 in the mounted state, laterally impacting splash water can be shielded better.

The treatment unit 14 is designed as a spin-on filter with a round cross section. It is substantially coaxial to the connection axis 20. The treatment unit 14 comprises a housing 56 with a housing pot 58 having a housing cover 60 fastened with its radially outer rim in the pot's open side by means of a crimp connection. A stable cover ring 61 is arranged on the housing cover 60 toward the connection head 12. A radially outer diameter of the housing 56 in the region of the housing cover 60 is smaller than a radial inner diameter of the splash guard part 150 of the connection head 12. The housing pot 58 comprises an outwardly curved housing bottom 62. The housing cover 60 and the housing pot 58 consist of metal. Optionally, the housing cover 60 can also be welded to the housing pot 58.

In the housing pot 58, a coaxial filter element 64 is arranged (FIGS. 3-5). The filter element 64 comprises a circumferentially closed filter medium folded to a filter bellows 66. At its end faces, the filter bellows 66 is connected seal-tightly to an attachment end disk 68, in FIG. 1 at the top, and a counter end disk 70 at the bottom. The attachment end disk 68 is located at the side of the filter element 64 which is facing the housing cover 60.

The filter bellows 66 surrounds an element interior 72 of the filter element 64. The element interior 72 is located at a clean side of the filter element 64.

The counter end disk 70 closes off the element interior 72 at the end face of the filter element 64 which is facing the housing bottom 62. At the exterior side of the counter end disk 70 which is facing the housing bottom 62, a plurality of spring elements 74 are supported which are supported at the other end at the housing bottom 62.

In the counter end disk 70, a spring-loaded bypass valve (not illustrated) can be arranged which permits in the open state, under conditions that are not of interest here, an oil flow of motor oil from the housing bottom 62 directly into the element interior 72 by bypassing the filter element.

The filter element 64 is surrounded radially outwardly by a raw-side annular space 78 which is delimited by the radially inner circumferential side of the housing pot 58.

In the element interior 72, moreover a coaxial central tube (not illustrated) can extend between the counter end disk 70 and the attachment end disk 68. A circumferential wall of the central tube is permeable for the motor oil. A radially inner circumferential side, namely radially inner fold edges, of the filter bellows 66 can be supported at the radially outer circumferential side of the central tube.

The attachment end disk 68 comprises a coaxial outlet opening 82 for the filtered motor oil. At the radial inner circumferential side, the attachment end disk 68 is formed as a coaxial cylinder socket 83 which extends away axially from the element interior 72.

At the side of the cylinder socket 83 which is axially facing away from the element interior 72, an annular coaxial inner seal unit 84 is attached. The inner seal unit 84 is comprised of an elastomer.

Radially outwardly, the inner seal unit 84 comprises a return flow blocking membrane 86. The return flow blocking membrane 86 is annular and surrounds the cylinder socket 83 radially outwardly. The return flow blocking membrane 86 is resting under a mechanical pretension against the inner side of the housing cover 60 which is facing the filter bellows 66. It closes, as illustrated in FIG. 3, in the pressureless state a coaxial annular inlet opening 88 of the housing cover 60 for motor oil. As soon as motor oil is supplied to the treatment device 10, the return flow blocking membrane 86 opens due to the oil pressure in flow direction. A return flow of the motor oil through the inlet opening 88 is prevented by the return flow blocking membrane 86.

A radially inner annular section of the inner seal unit 84 forms a coaxial inner annular seal 90. The inner annular seal 90 is positioned with its radially outer circumferential side seal-tightly at the radially inner circumferential side of the cylinder socket 83. The inner annular seal 90 is positioned with its radially inner circumferential side, when the treatment unit 14 is mounted, seal-tightly at a radially outer circumferential side of the radially inner attachment socket 22 that is designed as a seal surface. With the inner annular seal 90, the clean side of the treatment unit 14 is separated from its raw side in the region of the inlet opening 88.

The housing cover 60 comprises in the region of the inlet opening 88 a stepped coaxial outer seal socket 92. A constriction of the outer seal socket 92 at its end which is facing away from the filter bellows 66 forms an outer seal groove 94 for an outer annular seal 96. The outer annular seal 96 is configured as an O-ring.

A radially outer diameter of the outer seal socket 92 outside of the region of the seal groove 94 corresponds approximately to the radial inner diameter of the outer attachment socket 24 of the connection head 12. When the treatment unit 14 is mounted, the seal socket 92 is seated in the outer attachment socket 24. The radially outer circumferential side of the outer seal socket 92 is then resting against the radially inner circumferential side of the radially outer attachment socket 24.

The outer seal groove 94 is covered at its side that is axially facing away from the filter bellows 66 by a cover ring 98. The cover ring 98 is connected by means of clamping tabs to the outer seal socket 92.

When the treatment unit 14 is mounted, the outer annular seal 96 is resting seal-tightly against the radially inner circumferential side of the radially outer attachment socket 24 that is designed as a seal surface. The outer annular seal 96 separates thus the oil-conducting region of the treatment device 10 from the connection space 30 and from the environment. For example, the annular seal 96 is positioned at the same level as the bayonet rings, i.e., the head connection part 32 and the housing connection part 100 of the connection device 34.

At the latest when the cover ring 98 arrives at the end face of the radially outer attachment socket 24 of the connection head 12 and/or the housing connection part 100 at the head connection part 32, the treatment unit 14 is rotated additionally 34 about the connection axis 20 in clockwise rotation direction, which is the closing rotation direction of the connection device.

As soon as the free ends of the housing-side functional elements 104 are positioned in the region of the corresponding head-side insertion gap 50, guiding of the respective housing-side slide regions 142 at the respective assembly ramps 43 of the functional elements 44 begins. The spring arms 53 of the pretension element 54 are supported with their free ends with the straight sections 55 at the rim 57 of the housing pot 58 in axial direction. Due to the pulling action achieved by the gradient of the assembly ramps 43 and of the slide regions 142 in axial direction between the functional elements 44 and 104, the inner annular seal 90 is pulled onto the radially inner attachment socket 22 and the outer annular seal 96 into the radially outer attachment socket 24.

As soon as the housing-side lock projections 106 abut against the corresponding head-side lock projections 46, a corresponding locking force must be overcome for further rotation. The locking force is realized in addition by the restoring force of the spring arms of the leaf spring 54.

After overcoming the locking force, the housing-side lock projections 116 lock behind the housing-side lock projections 46 and secure in this way the connection device 34 against accidental opening.

For separating the treatment unit 14 from the connection head 12, the treatment unit 14 is rotated in a left-handed rotation direction, i.e., in the opening rotation direction, about the connecting axis 20. For this purpose, first the locking force of the housing-side lock projections 106 with the head-side lock projections 46 must be overcome.

Under the spring pretension of the pretension element 54, the inner support regions 105 are guided along the corresponding support regions 45 of the head-side functional elements 44. Moreover, the outer housing-side support regions 105 are guided along the respective guide pins. In doing so, an axial pushing force on the outer housing-side support regions 105 is generated by the guide pins which act against a respective holding force of the inner annular seal 90 and of the outer annular seal 96. The holding forces are realized by the respective friction between the inner annular seal 90 and the inner attachment socket 22 and between the outer annular seal 96 and the outer attachment socket 24. By means of the pushing force, the inner annular seal 90 is pulled off the inner attachment socket 22 and the outer annular seal 96 out of the outer attachment socket 24 in axial direction, respectively.

As soon as upon further rotational movement the housing-side functional elements 104 leave the corresponding head-side insertion gaps 50, the treatment unit 14 is pulled off the connection head 12 with an axial movement.

In operation of the treatment device 10, i.e., in operation of the internal combustion engine, motor oil to be purified flows through the infeed 16, indicated by an arrow 112, into the annular inlet space 26. From here, the motor oil flows through the inlet opening 88, released by the return flow blocking membrane 86, into the raw-side annular space 78 of the filter housing 56. The motor oil to be purified flows through the filter bellows 66 from the exterior to the interior in radial direction and reaches the element interior 72 via the openings of the central tube 88. From the element interior 72, the purified motor oil flows through the outlet opening 82 and the radially inner attachment socket 22 of the connection head 12 to the drain 18. The purified motor oil leaves the connection head 12 and thus the treatment device 10 through the drain 18.

Figure 18:
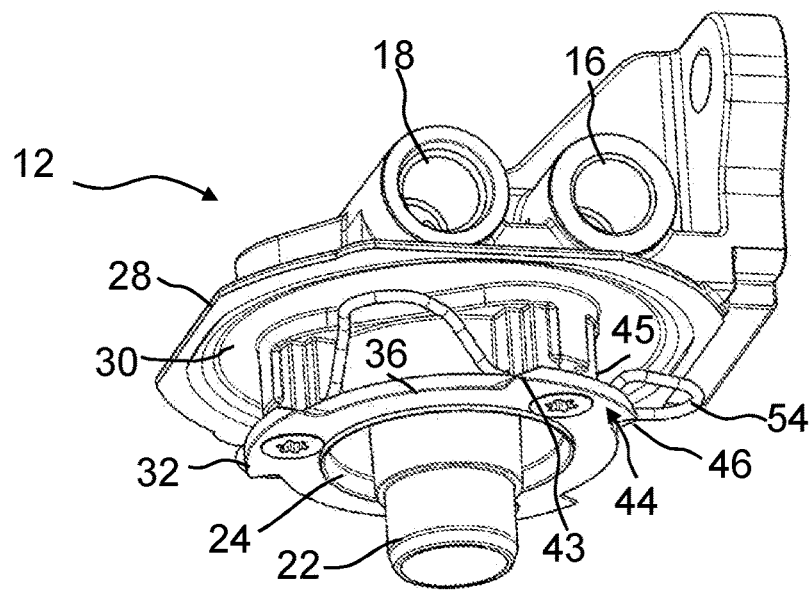
FIG. 18 shows an isometric illustration of a connection head of a treatment device according to a further embodiment of the invention.
Figure 19:
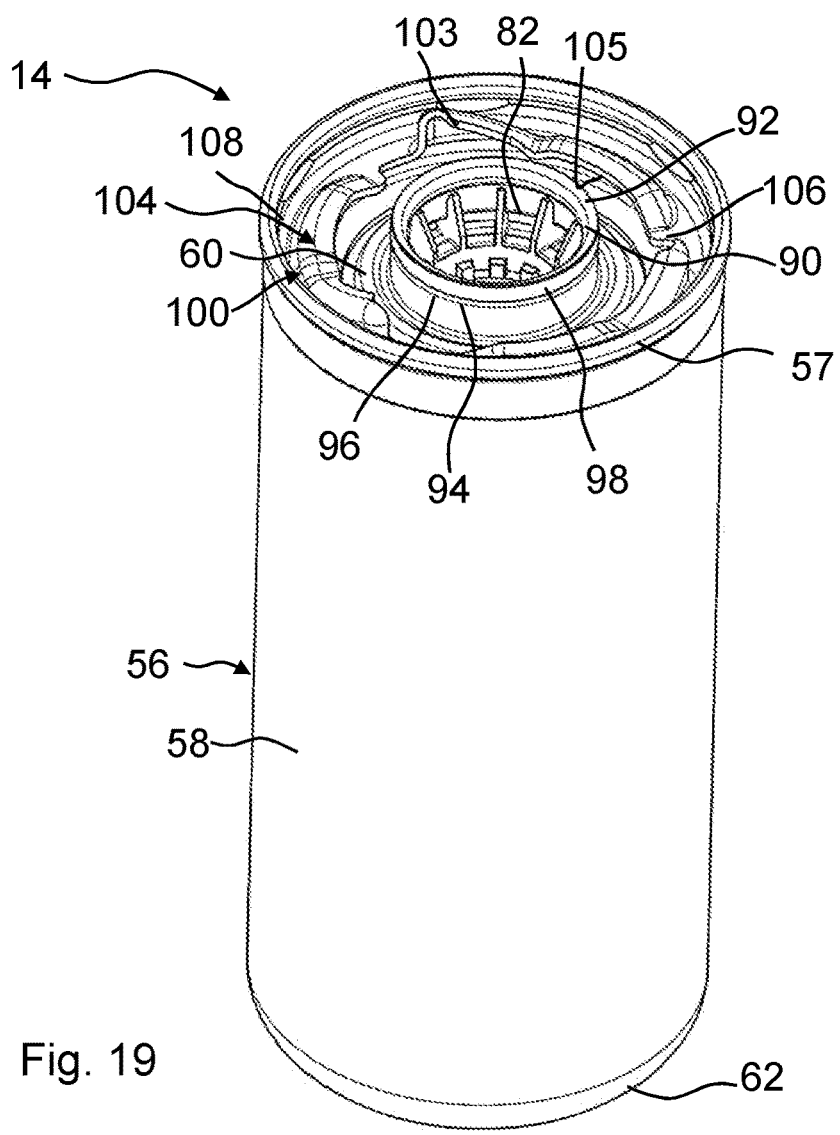
FIG. 19 shows an isometric illustration of a treatment unit of a treatment device according to a further embodiment of the invention with top view of the housing connection part for a connection head according to FIG. 18.
Figure 20:
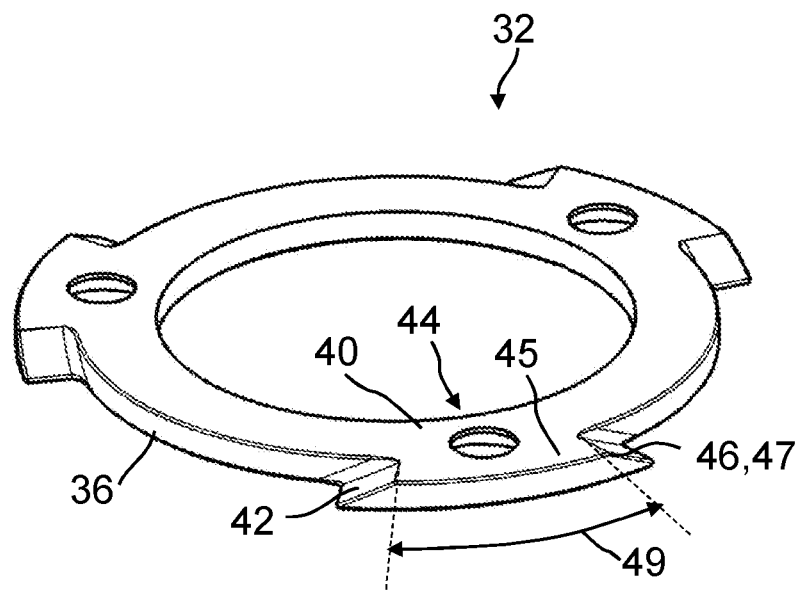
FIG. 20 shows in top view the head connection part for the connection head according to FIG. 18.
Figure 21:
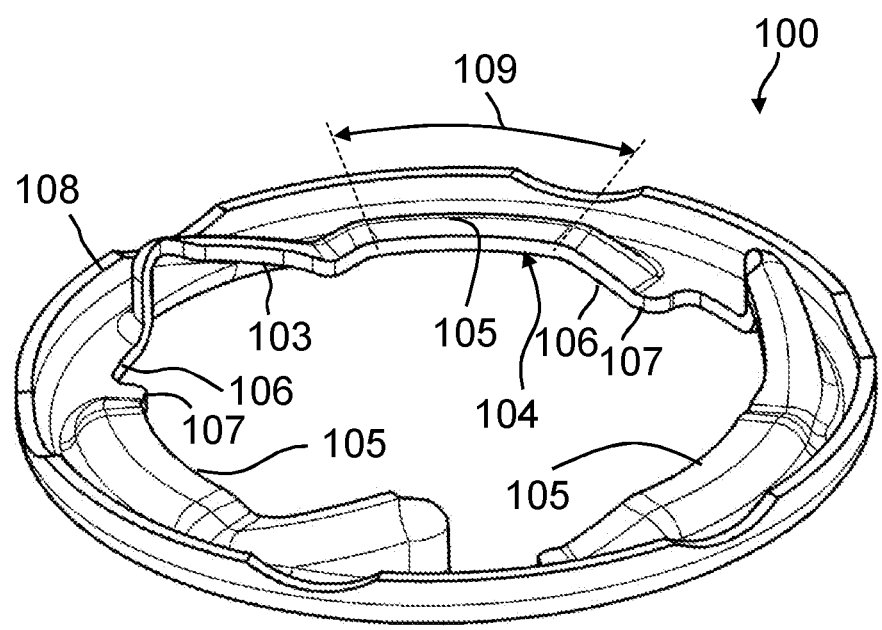
FIG. 21 shows in top view the housing connection part according to FIG. 18.

In FIGS. 18 to 21, a second embodiment of a treatment device 10 in the form of a filter device is illustrated. Those elements that are similar to those of the first embodiment of FIGS. 1 to 17 are provided with the same reference characters. FIG. 18 shows an isometric illustration of a connection head 12 of a treatment device 10, FIG. 19 shows an isometric illustration of a treatment unit 14 of the treatment device 10 with top view of the housing connection part 100 for the connection head 12 according to FIG. 18. FIG. 20 shows in isometric view the head connection part 32 for the connection head 12, and FIG. 21 shows in isometric view the housing connection part 100.

In this embodiment, the functions of the functional elements 44, 104 are switched. The housing connection section 100 comprises functional elements 104 with assembly ramps 103 which pass into straight support surfaces 105, respectively, that extend perpendicularly in relation to the connection axis 20.

The head connection part 32 comprises three functional elements with a respective slide region 42 (FIG. 20) which passes into a corresponding support surface 45. Selectively, the functional elements 44 can be embodied outwardly open in the head connection part 32, as illustrated in FIG. 20, or embodied open inwardly (not illustrated).

The number of functional elements 44, 104 can selectively also be four or five.

What is claimed is:

1. A treatment device for treating a fluid, the treatment device comprising:
an exchangeable treatment unit comprising a housing;
a connection head; and
a detachable bayonet-type connection device configured to connect the connection head and the treatment unit to each other by performing a plug-in/rotation movement about a connection axis of the treatment device;
wherein the detachable bayonet-type connection device comprises a housing connection part provided at the housing of the treatment unit and further comprises a head connection part provided at the connection head, wherein the housing connection part and the head connection part are configured to operatively engage each other to form a connection of the detachable bayonet-type connection device;
wherein the housing connection part comprises a mutually complementary functional element extending in a circumferential direction about the connection axis and the head connection part comprises a mutually complementary functional element extending in the circumferential direction about the connection axis, wherein the mutually complementary functional element of the housing connection part and the mutually complementary functional element of the head connection part are configured to operatively engage each other;
wherein one of the mutually complementary functional elements comprises an assembly section, an assembly ramp and a first support region, and wherein the assembly ramp passes in an axial direction at a slant in relation to the connection axis into the first support region that is perpendicular in relation to the connection axis;
wherein the other one of the mutually complementary functional elements comprises a slide region configured to slide on the assembly ramp and a second support region that is perpendicular in relation to the connection axis, and wherein the second support region adjoins the slide region circumferentially in the axial direction;
wherein, in a connection end position of the connection of the detachable bayonet-type connection device, a contact surface of the second support region facing opposite the first support region rests against the first support region in the axial direction; and
wherein the assembly ramp is arranged outwardly from the assembly section in a radial direction in relation to the connection axis, and wherein a gap is provided between a leading end of the assembly ramp and a plane of the assembly section.

2. The treatment device according to claim 1, wherein, in the circumferential direction, a first end stop and/or a first lock element adjoins the first support region and wherein a second end stop and/or a second lock element adjoins the second support region.

3. The treatment device according to claim 1, wherein a total length of the first support region or of the second support region, measured in the circumferential direction on a selected radius, occupies at least 20% of a corresponding circumference of the housing connection part measured on the same selected radius and/or of a corresponding circumference of the head connection part measured on the same selected radius.

4. The treatment device according to claim 1, wherein a plurality of the first support region or of the second support region are provided and wherein a total length of the plurality of the first support regions or of the second support regions, measured in the circumferential direction on a selected radius, occupies at least 20% of a corresponding circumference of the housing connection part measured on the same selected radius and/or of a corresponding circumference of the head connection part measured on the same selected radius.

5. The treatment device according to claim 1, wherein the mutually complementary functional elements comprise at least one lock element of at least one lock safety device, which, in a closed position of the detachable bayonet-type connection device, lock behind each other, lock with each other, or lock within each other.

6. The treatment device according to claim 1, wherein the detachable bayonet-type connection device comprises at least one pretension element configured to realize a mechanical pretension pressing the mutually complementary functional elements against each other.

7. The treatment device according to claim 1, wherein the exchangeable treatment unit and the connection head each comprise one or more correspondence elements, wherein the one or more correspondence elements of the exchangeable treatment unit correspond with the one or more correspondence elements of the connection head in one or more pairs of correspondence elements when the exchangeable treatment unit is mounted at the connection head.

8. The treatment device according to claim 7, wherein the one or more correspondence elements of the exchangeable treatment unit and the one or more correspondence elements of the connection head are sockets selected from the group consisting of attachment sockets, connection sockets, seal sockets, and cylinder sockets.

9. The treatment device according to claim 7, wherein the one or more pairs of correspondence elements include a first pair of correspondence elements and a second pair of correspondence elements, wherein the first pair of correspondence elements is arranged within the second pair of correspondence elements.

10. The treatment device according to claim 1, wherein the head connection part and/or the housing connection part consists of sheet steel or comprises sheet metal.

11. A treatment unit for a treatment device, the treatment unit comprising:
- a housing comprising a housing pot, a housing cover, at least one inlet for a fluid to be treated, and at least one outlet for the treated fluid;
- wherein the treatment unit is configured to connect to a connection head of the treatment device by a detachable bayonet-type connection device by performing a plug-in/rotation movement about a connection axis of the treatment device;
- wherein the housing comprises a housing connection part forming a part of the detachable bayonet-type connection device, wherein the housing connection part is configured to connect the treatment unit to a head connection part arranged at the connection head;
- wherein the housing connection part comprises a functional element configured to operatively connect to a complementary functional element of the head connection part, and wherein the functional element of the housing connection part comprises a support region that is perpendicular in relation to the connection axis and a slide region that adjoins the support region circumferentially in an axial direction in relation to the connection axis, or an assembly ramp that extends circumferentially in the axial direction at a slant in relation to the connection axis and passes into the support region with the assembly ramp arranged outwardly from an assembly section in a radial direction in relation to the connection axis and with a gap provided between a leading end of the assembly ramp and a plane of the assembly section; and
- wherein a plurality of the support region are provided and a length of each support region, measured in a circumferential direction about the connection axis on a selected radius, occupies at least 20% of a corresponding circumference of the housing connection part measured on the selected radius.

12. The treatment unit according to claim 11, wherein a total length of the plurality of the support regions, measured in the circumferential direction about the connection axis on the selected radius, occupies at least 20% of the corresponding circumference of the housing connection part measured on the same radius.

13. The treatment unit according to claim 11, wherein the housing connection part is fastened to the housing by a crimp connection connecting the housing cover to the housing pot.

14. The treatment unit according to claim 11, wherein the housing connection part is fastened by a material-fused connection to the housing cover and/or to the housing pot.

15. The treatment unit according to claim 11, wherein the housing connection part consists of sheet metal or comprises sheet metal.

16. The treatment unit according to claim 15, wherein a material thickness of the sheet metal of the housing connection part is constant at least in a region of the functional element of the housing connection part.

17. The treatment unit according to claim 11, wherein the support region is adjoined in a circumferential direction about the connection axis by an end stop and/or by a lock element.

18. The treatment unit according to claim 11, wherein the housing cover comprises a cover ring and wherein the housing connection part comprises a rim connected fixedly to the cover ring of the housing cover.

19. The treatment unit according to claim 11, wherein the housing connection part comprises an anti-rotation device arranged at an outer circumference of the housing connection part.

20. The treatment unit according to claim 19, wherein the housing connection part comprises a rim, wherein the anti-rotation device is at least one notch at the rim of the housing connection part.

21. The treatment unit according to claim 11, wherein the functional element of the housing connection part comprises a lock element of a lock safety device, wherein the lock element is a lock projection or a lock section or a recess.

22. A connection head for a treatment device for connecting to a treatment unit of the treatment device:
- wherein the connection head is configured to connect to the treatment unit by a detachable bayonet-type connection device by performing a plug-in/rotation movement about a connection axis of the treatment device;
- wherein the connection head comprises a head connection part forming a part of the detachable bayonet-type connection device, wherein the head connection part is configured to connect the connection head to a housing connection part of the treatment unit;
- wherein the head connection part comprises a functional element configured to operatively connect to a complementary functional element of the housing connection part of the treatment unit, wherein the functional element of the head connection part comprises a support region that is perpendicular in relation to the connection axis and a slide region that adjoins the support region circumferentially in an axial direction in relation to the connection axis, or an assembly ramp that extends circumferentially in the axial direction at a slant in relation to the connection axis and passes into the support region with the assembly ramp arranged outwardly from an assembly section of the functional element of the head connection part in a radial direction relative to the connection axis and with a gap provided between a leading end of the assembly ramp and a plane of the assembly section.

23. The connection head according to claim 22, wherein a total length of the support region, measured in a circumferential direction about the connection axis on a selected radius, occupies at least 20% of a corresponding circumference of the head connection part measured on the same selected radius.

24. The treatment unit according to claim 22, wherein a plurality of the support regions are provided and wherein of a total length of the plurality of the support regions, measured in a circumferential direction about the connection axis on a selected radius, occupies at least 20% of a corresponding circumference of the head connection part measured on the same selected radius.

25. The connection head according to claim 22, wherein the functional element of the head connection part comprises a lock element of a lock safety device, wherein the lock element is a lock projection or a lock section or a recess.

* * * * *